(12) United States Patent
Matsuzawa et al.

(10) Patent No.: US 7,933,043 B2
(45) Date of Patent: Apr. 26, 2011

(54) PRINTER COLORIMETRY CONTROL DEVICE, PRINT COLORIMETRY CONTROL METHOD AND PRINTER

(75) Inventors: Yoshihiko Matsuzawa, Matsumoto (JP); Kentaro Miyazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 11/975,653

(22) Filed: Oct. 18, 2007

(65) Prior Publication Data
US 2008/0218777 A1    Sep. 11, 2008

(30) Foreign Application Priority Data

Oct. 18, 2006   (JP) .................................. 2006-284279

(51) Int. Cl.
*H04N 1/40* (2006.01)
(52) U.S. Cl. ........................ 358/1.9; 358/504; 347/251
(58) Field of Classification Search .................. 358/1.9, 358/504; 347/251
See application file for complete search history.

(56) References Cited

U.S. PATENT DOCUMENTS

| | | | | |
|---|---|---|---|---|
| 6,278,477 B1 * | 8/2001 | Ohba | .............................. | 347/251 |
| 2002/0051131 A1 * | 5/2002 | Ohkubo | ........................ | 356/421 |
| 2002/0059879 A1 * | 5/2002 | Komori et al. | ................. | 101/484 |
| 2003/0001918 A1 * | 1/2003 | Tsuchiya et al. | ................. | 347/19 |
| 2004/0123760 A1 * | 7/2004 | Morikawa et al. | ............ | 101/364 |
| 2005/0207768 A1 * | 9/2005 | Suzuki | ............................ | 399/49 |
| 2006/0170991 A1 | 8/2006 | Jacob et al. | | |

FOREIGN PATENT DOCUMENTS

| | | |
|---|---|---|
| JP | 2000-37937 | 2/2000 |
| JP | 2000-301811 | 10/2000 |
| JP | 2001-287407 | 10/2001 |
| JP | 2004-50610 | 2/2004 |
| JP | 2005-275855 | 10/2005 |
| JP | 2006-192680 | 7/2006 |
| JP | 2006-211665 | 8/2006 |
| JP | 2006-256086 | 9/2006 |

* cited by examiner

*Primary Examiner* — King Y Poon
*Assistant Examiner* — Allen H Nguyen
(74) *Attorney, Agent, or Firm* — Nutter McClennen & Fish LLP; John J. Penny, Jr.; Christina M. Sperry

(57) ABSTRACT

A print and colorimetry control device includes a print control section which controls so that an image for which colorimetry is to be carried out is printed on a printing medium, based on predetermined image data, a determining section which determines a position where a colorimetry section is caused to carry out colorimetry for the image based on a printing position of the image on the printing medium, a feeding section which feeds the printing medium having finished printing, based on the determined position, a colorimetry control section which controls the colorimetry section based on the determined position so that the colorimetry section is caused to carry out colorimetry thereby to obtain a calorimetric value of the image.

12 Claims, 26 Drawing Sheets

PRINTER COLORIMETRY CONTROL DEVICE, PRINT COLORIMETRY CONTROL METHOD AND PRINTER

CROSS-REFERENCE TO RELATED APPLICATIONS

The entire disclosure of Japanese Patent Application No. 2006-284279, filed Oct. 18, 2006, is expressly incorporated by reference herein.

BACKGROUND

1. Technical Field

The present invention relates to a print and colorimetry control device carrying out printing and colorimetry of an image, a print and colorimetry control method and a printer.

2. Related Art

JP-A-2001-287407 discloses a printer provided with a calorimetric function section measuring a color of paper on which printing is to be carried out prior to a printing operation.

An image printed on paper by a printer can be a target for colorimetry for various purposes such as calibration of the printer. However, the above-referenced JP-A-2001-287407 cannot guarantee accurate colorimetry of an image on paper after the printing process. Furthermore, when colorimetry is carried out for paper by a colorimetry section after the printing process, a user needs to set the paper at a prescribed position so that colorimetry of the target image can be carried out at an accurate position by the colorimetry section. Thus, the work from the printing of an image to colorimetry is troublesome and difficult.

SUMMARY

Therefore, an advantage of some aspects of the present invention is to provide a print colorimetry control device carrying out printing and colorimetry of an image, a print colorimetry control method and a printer each of which can realize the processing from the printing of an image to colorimetry as a sequential work in which burden of the user is reduced as much as possible.

The present invention provides a print and colorimetry control device comprising a print control section which controls so that an image for which colorimetry is to be carried out is printed on a printing medium, based on predetermined image data, a determining section which determines a position where a colorimetry section is caused to carry out colorimetry for the image based on a printing position of the image on the printing medium, a feeding section which feeds the printing medium having finished printing, based on the determined position, and a colorimetry control section which controls the colorimetry section based on the determined position so that the colorimetry section is caused to carry out colorimetry thereby to obtain a calorimetric value of the image.

According to the above-described device, the position where the colorimetry section is caused to carry out colorimetry is automatically computed after the image has been printed on the printing medium. Based on the obtained position, the printing medium is fed and colorimetry is carried out by the colorimetry section. Consequently, since the printing of the image and colorimetry are realized as a sequential work, the work can be rendered easier and an accurate calorimetric value can be obtained without variations in the calorimetric position.

More specifically, the determining section computes a distance between the image for which colorimetry is to be carried out and the colorimetry section, based on image position information defining the printing position of the image on the printing medium and medium position information relating to a position of the printing medium, thereby determining the position where the colorimetry section is caused to carry out colorimetry for the image. The image position information specifies a starting position of the image on the printing medium, a size of the image and the like. When the distance between the image and the colorimetry section is computed based on such information, a distance is determined that is necessary for aligning the image with the colorimetry section.

The alignment of the image and the colorimetry section can be realized by moving either the image or the colorimetry section. However, both of the image or the colorimetry section may be moved. For this purpose, the feeding section feeds the printing medium printed with the image according to the computed distance in a medium feed direction, and the colorimetry control section moves the colorimetry section in a direction substantially perpendicular to the medium feed direction according to a distance between the image and the colorimetry section in a moving direction of the colorimetry section. More specifically, since the printing medium is normally fed in a fixed direction when printed, the printing medium is also fed by a necessary distance utilizing the feeding mechanism. Consequently, displacement between the image and the colorimetry section can be resolved. Furthermore, the colorimetry control section moves the colorimetry section in the vertical direction according to the distance between the image and the colorimetry section in the feed direction. According to the construction, the image and the colorimetry section can be aligned easily utilizing the mechanism which is originally used for the printing process.

Furthermore, the colorimetry section may be capable of controlling the operation of a drier which dries the printing medium. When a forced drying which forcibly dries the image on the printing medium for which colorimetry is to be carried out, the image is dried by the drier before colorimetry. When the colorimetry is carried out after the image has been printed, a certain period is necessitated until the colors of the image are rendered stable. According to the above-described construction, the image can forcibly be dried and consequently, a sequential process from the printing to the colorimetry can be carried out in a shorter period of time.

The colorimetry section and the drier may be provided at respective predetermined positions in the medium feed direction. The determining section computes a distance from the image via a position of the drier to the colorimetry section in the medium feed direction when the forced drying is carried out. The feeding section feeds the printing medium printed with the image via the position of the drier based on the computed distance. According to the construction, the printing medium on which the image as the target of colorimetry has been printed can be allowed to go through the drier when fed to the colorimetry section. Since the forced drying can be carried out at a place where the printing medium is caused to go through, a sequential process from the printing to the colorimetry can be carried out smoothly.

Furthermore, the print and colorimetry control device may further comprises a judging section which compares a colorimetric value of the image obtained by the colorimetry section with a previously provided reference color value of the image, thereby judging whether a printing process by the print control section has normally been carried out, based on a result of comparison. As the result of the judgment, a measure such as repair of each mechanism of the print control can be taken when the calorimetric value varies from an ideal color (reference color value) to some degree. On the other hand, when an ideal color corresponds with the calorimetric value, it can be confirmed that an ideal color is reproduced by the print control section.

The invention further provides a printer comprising a print control section which prints an image for which colorimetry is to be carried out on a printing medium, based on predetermined image data, a colorimetry section, a determining section which determines a position where the colorimetry section is caused to carry out colorimetry for the image based on a printing position of the image on the printing medium, a feeding section which feeds the printing medium having finished printing, based on the determined position, and a colorimetry control section which controls the colorimetry section based on the determined position so that the colorimetry section is caused to carry out colorimetry thereby to obtain a calorimetric value of the image.

Of course, it is possible to comprehend a print and colorimetry control method and a printing method both including a step of carrying out each construction or arrangement provided in the above-described print and colorimetry control device or printer, and further a print and colorimetry control program product and printing program product both causing a computer to realize functions corresponding to each construction or arrangement provided in the above-described print and colorimetry control device or printer.

DESCRIPTION OF EXEMPLARY EMBODIMENT

An embodiment of the present invention will be described according to the following order:
1. Schematic arrangement of embodiment of the invention;
2. First embodiment;
2-1. Composite image printing process/application side;
2-2. Composite image printing process/printer side;
2-3. Verification chart drying and colorimetry processes/application side;
2-4. Verification chart drying and colorimetry processes/printer side;
2-5. Verification process;
2-6. Abut exclusive use of printer;
3. Second embodiment;
4. Colorimetry device position setting process; and
5. Summary

1. Schematic Arrangement of Embodiment of the Invention

Figure 1:
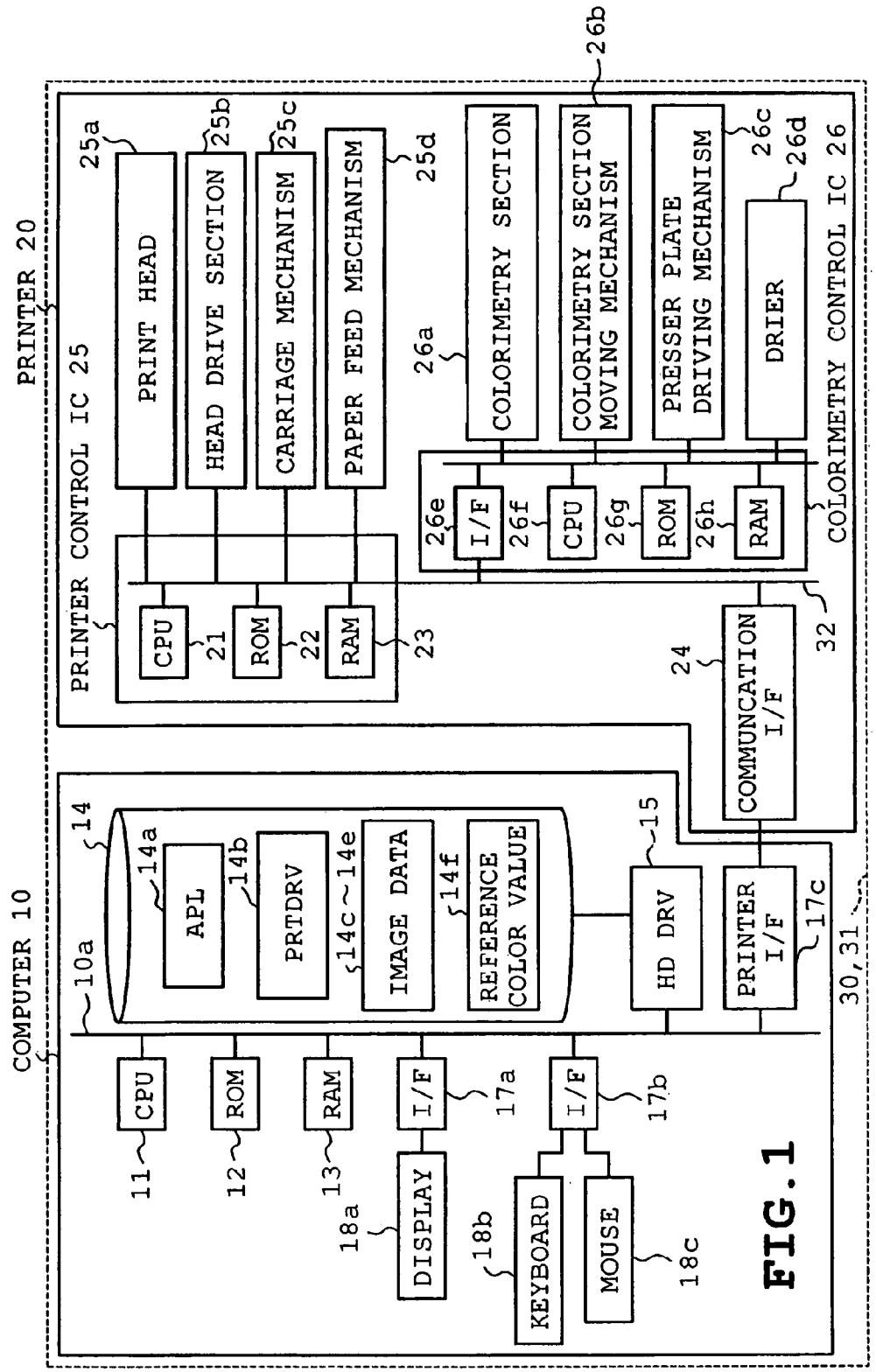
FIG. 1 is a schematic block diagram showing a print and colorimetry control device.

FIG. 1 shows a computer 10 and a printer 20 constituting a print and colorimetry control device 30. The computer 10 and a printer 20 also constitute a printer control system 31. The computer 10 includes a central processing unit (CPU) 11 forming the center of computation and controlling the whole computer 10 via a system bus 10a. To the system bus 10a are connected ROM 12, RAM 13, various interfaces (I/Fs) 17a to 17c. A hard disc (HD) 14 is also connected via a hard disc drive (HDD) 15 to the system bus 10a. An operating system (OS), application program (APL) 14a and the like are stored on the HD 14 and are arbitrarily transferred to RAM 13 by the CPU 11 thereby to be executed. Furthermore, the HD 14 is a storage area to store image data 14c to 14e provided for printing various images, reference color values 141 used as a reference value in an verification process which will be described later, and the like. To the I/F 17a is connected a display 18a displaying an image corresponding to predetermined image data based on the data. A keyboard 18b and a mouse 18c are connected to the I/F 17b. A printer 20 is connected, for example, via a serial I/F cable to the printer I/F 17c.

The printer 20 is a printing apparatus controlled by the computer 10. In the embodiment, the printer 20 is provided with a colorimetry function of carrying out colorimetry for a printed matter as well as a function of printing on printing paper. That is, the printer 20 is a printer with a colorimetry section and includes a communication I/F 24, printer control IC 25, colorimetry control IC 26 and the like, all of which are connected via a bus 32 to one another. The printer control IC 25 includes a CPU 21, ROM 22 and RAM 23, and the colorimetry control IC 26 includes an I/F 26e, CPU 261, ROM 26g and RAM 26h. The communication I/F 24 (specific interface) is connected to the printer I/F 17c. The computer 10 and the printer 20 are connected to the printer I/F 17c and the communication I/F 24 to realize bi-directional communication. The communication I/F 24 receives luster data of different ink types transmitted from the computer 10.

In the printer control IC 25, the CPU 21 carries out processing according to predetermined software (printer controller 250) stored on the ROM 22. Thus, the printer control IC 25 (printer controller 250) is said to be a print control section. The printer control IC 25 is mainly an IC carrying out control for print processing and connected to a print head 25a, a head drive section 25b, a carriage mechanism 25c and a paper feeding mechanism 25d for control of each section.

The print head 25a comprises a plurality of ink cartridges corresponding to a plurality of types of inks (cyan (C), magenta (M), yellow (Y), black (K), light cyan (Lc) and light magenta (Lm), for example) and a plurality of nozzle rows corresponding to the ink types, respectively. Ink filling each cartridge is discharged as ink drops so that an image is formed on printing paper. The printer control IC 25 delivers to the head drive section 25b applied voltage data corresponding to the luster data. The head drive section 25b generates from applied voltage data a pattern of voltage applied to a piezo-electric element provided in each nozzle row of the print head 25a and delivers the pattern to cause the print head 25a to discharge an ink drop (dot) for every ink type.

The carriage mechanism 25c is controlled by the printer control IC 25 to reciprocate a carriage (not shown) along a guide rail (not shown) of the printer 20. The print head 25a is mounted on the carriage so as to be reciprocated (scan) along the guide rail. The paper feed mechanism 25d is controlled by the printer control IC 25 so that printing paper is fed at a predetermined speed by paper feed rollers in a direction (paper feed direction) substantially perpendicular to the reciprocating direction (main scan direction) of the carriage. The printer 20 may be of thermal type or die sublimation type which form a printed image by other mechanisms, or may be a line head printer.

In the colorimetry control IC 26, the CPU 26f carries out processing according to predetermined software (colorimetry controller 260) stored on the ROM 26g. The colorimetry control IC 26 (colorimetry controller 260) can be said to be a colorimetry control section. The colorimetry control IC (colorimetry control section) 26 is mainly an IC carrying out control for colorimetry processing and connected to a colorimetry section 26a, a colorimetry section moving mechanism 26b, a presser plate moving mechanism 26c, a drier 26d for control of each section. The colorimetry section 26a directs a color detector to an object of colorimetry so as to be capable of obtaining, as a colorimetry value, a color value comprised of a plurality of color components L, a and b based on an L*a*b* surface color system (symbol "*" will hereinafter be eliminated) defined by International Committee on Illumination (CIE). The colorimetry value obtained by the colorimetry section 26a is delivered to the computer 10. An Lab color space is a uniform color space not depending upon any device. Of course, a color space for which colorimetry is to be carried out may be an L*u*v* color space defined by the CIE, an XYZ color space defined by CIE, an RGB color space.

The colorimetry section moving mechanism 26b is controlled by the colorimetry control IC 26 to reciprocate the colorimetry section 26a along the presser plate which will be described in detail later. The presser plate moving mechanism 26c presses printing paper against the presser plate based on the control of the colorimetry control IC 26 so that the printing paper fed to a position where the printing paper is opposed to the colorimetry section 26a is prevented from being moved during a colorimetry work. The drier 26d is provided near the colorimetry section 26a to feed hot air to printing paper based on the control of the colorimetry control IC 26, thereby forcibly drying an image on the printing paper. Thus, a sequential process of printing an image on printing paper, drying and colorimetry can be carried out by the single printer 20.

Figure 2:
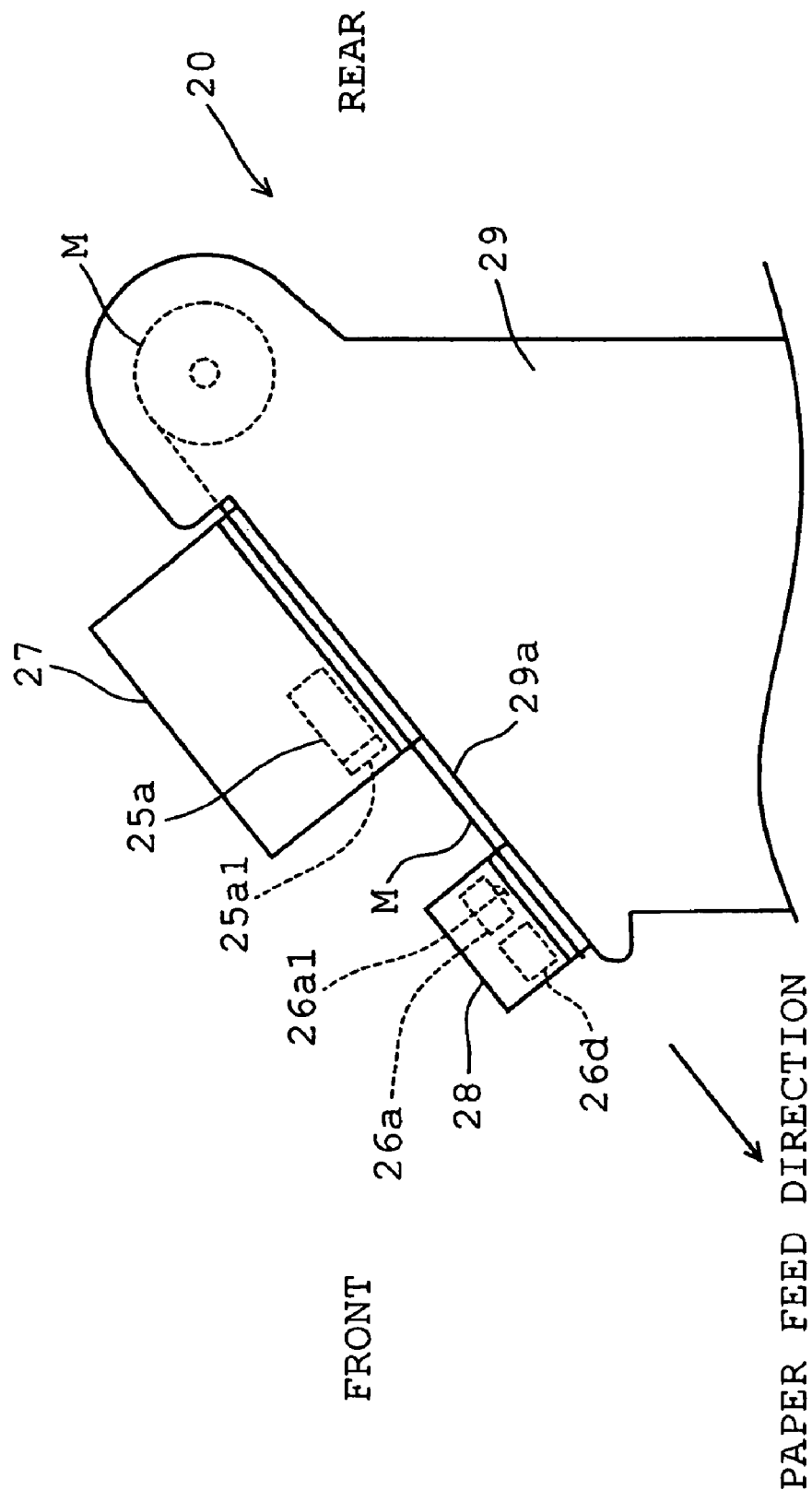
FIG. 2 is a side view of a printer.

FIG. 2 is a schematic side view of the printer 20. The printer 20 includes a body 29 with a head. A roll of printing paper M (roll paper M) is accommodated near the top of the head. The printing paper M is conveyed in the paper feed direction substantially along an inclined face 29a formed on a forward side of the body 29. A casing 27 is provided at a predetermined location on the inclined face 29a. A print head 25a is accommodated in the casing 27. The print head 25a is moved along the aforesaid guide rail in the direction perpendicular to the surface of FIG. 2 (the aforesaid main scan direction). Furthermore, a cutter 25a1 is mounted on the print head 25a so as to be reciprocated with the print head. A colorimetry drying unit 28 is installed at a predetermined position on the inclined face 29a downstream relative to the casing 27 in the paper feed direction. The colorimetry drying unit 28 accommodates the colorimetry section 26a and the drier 26d therein and is mounted to the inclined face 29a so as to assume the predetermined position. The printing paper M passes below the casing 27 and the colorimetry drying unit 28 when conveyed.

Figure 3:
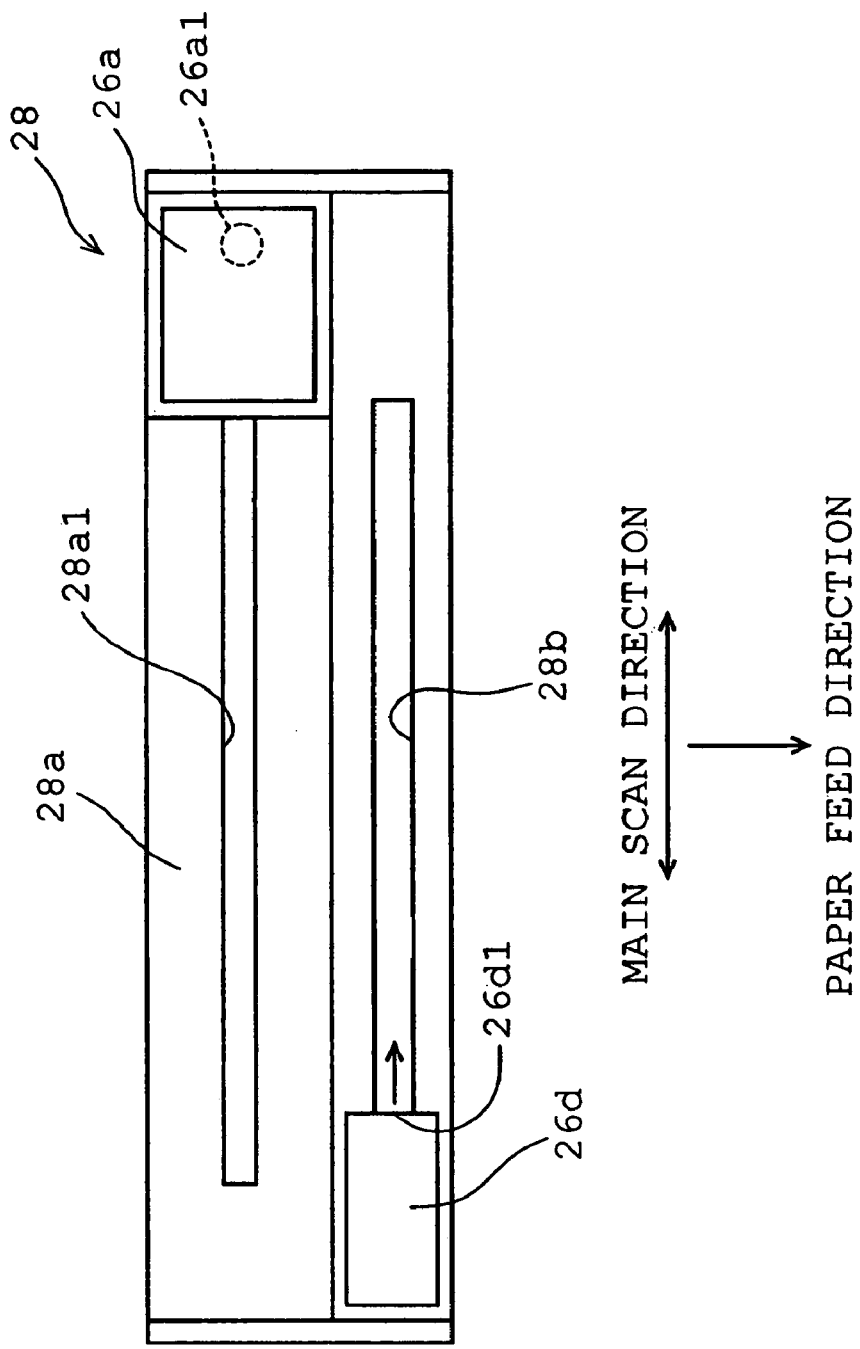
FIG. 3 shows an arrangement of colorimetry and drying unit.

FIG. 3 shows the interior of the colorimetry drying unit 28 as viewed at a viewpoint opposed to the inclined face 29a. The colorimetry drying unit 28 is mounted so that a lengthwise direction thereof is parallel to the main scan direction. In the embodiment, the colorimetry section 26a is accommodated in the colorimetry drying unit 28 so as to be located upstream in the convey direction, whereas the drying unit 26d is accommodated in the colorimetry section 26a so as to be located downstream in the convey direction. The colorimetry section 26a is on standby at an initial position located at an end of the colorimetry drying unit 28 while the color detecting section 26a1 is directed to the inclined face 29a side. A white tile is placed under the color detecting section 26a1 in order to calibrate the colorimetry section 26a. In the embodiment, a left end of the colorimetry drying unit 28 in the case where directed the paper feed direction (downstream side) is referred to as the initial position of the colorimetry section 26a. An elongated presser plate 28a is installed next to the initial position so as to extend in the main scan direction. The presser plate 28a is on standby at a position spaced away from the inclined face 29a by a predetermined distance. When driven by a presser plate driving mechanism at a predetermined time, the presser plate 28a presses, from above, the printing paper M conveyed below the colorimetry drying unit 28.

The colorimetry section 26a is moved over the presser plate 28a in the main scan direction by the colorimetry section moving mechanism 26b. The presser plate 28a has an elongate hole 28a1 which is formed through a central part thereof so as to extend lengthwise. The color detecting section 26a1 of the colorimetry section 26a in motion is caused to be opposed to the printing paper M on the inclined face 29a through the elongate hole 28a1, whereby colorimetry is carried out for an image printed on the printing paper M.

On the other hand, the drier 26d is fixed to a right end of the colorimetry drying unit 28 when directed to the paper feed direction. The drier 26d is installed downstream relative to the colorimetry section 26a in order that influences of heat generated by the drier 26d on the print head 25a may be reduced. More specifically, the color of ink retained by the print head 25a is changed by the heat. Accordingly, the drier 26d is spaced as far as possible from the print head 25a.

The drier 26d includes a heater serving as a heat source and a fan supplying warm air produced by the heater out of the drier. The drier 26d has a wall which faces the interior of the colorimetry drying unit 28 and is formed with an air-supply opening 26d1 through which the fan supplies hot air through the air-supply opening 26d1 outside the drier 26d. Furthermore, the colorimetry drying unit 28 located below the drier 26d has an underside formed with an elongate through hole 28b extending from near the air-supply opening 26d1 in the lengthwise direction with respect to the colorimetry drying unit 28. As the result of the above-described construction, hot air supplied through the air-supply opening 26d1 flows through the elongate hole 28b below the colorimetry and drying unit 28, thereby drying the printing paper M on the inclined face 29a. The face of the printer 20 conveying the printing paper M may be a horizontal face, instead of the inclined face as shown in FIG. 2.

Figure 4:
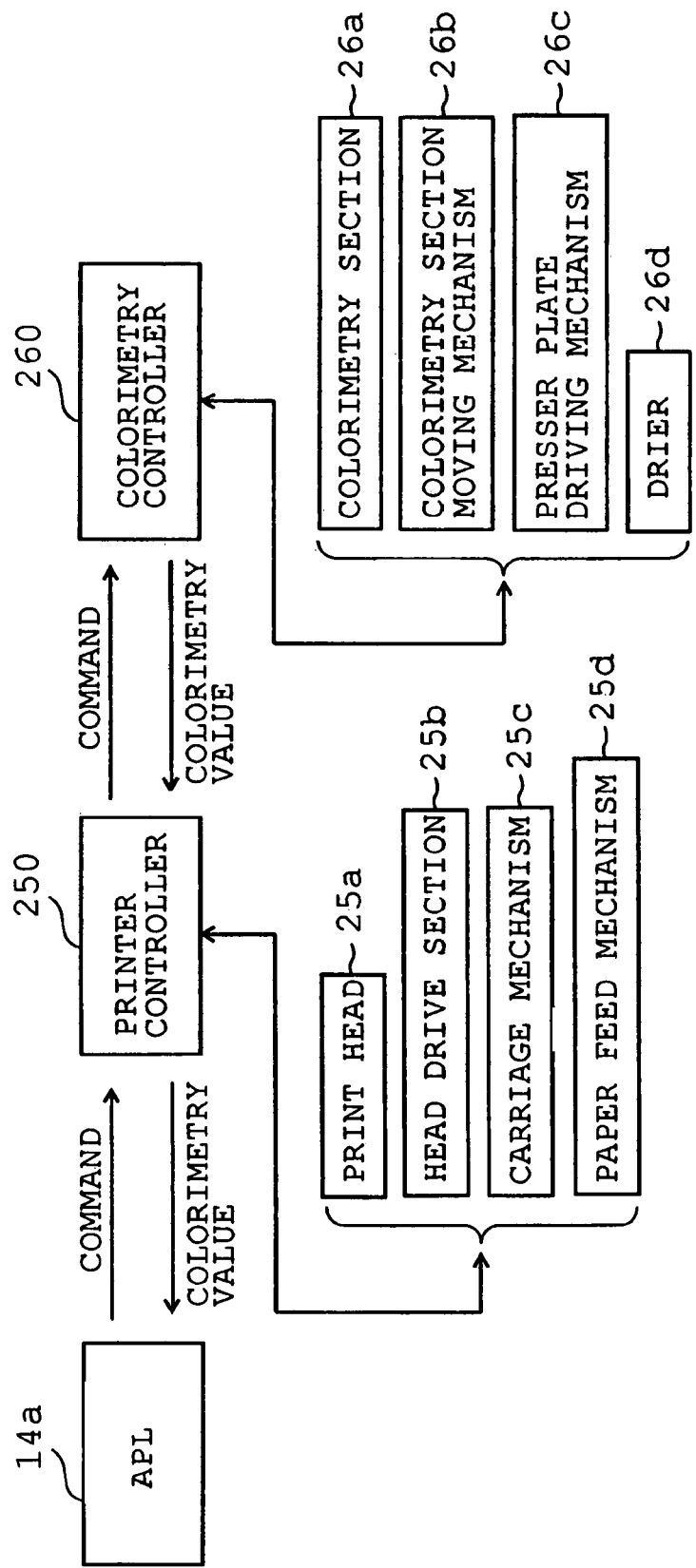
FIG. 4 shows an order system between pieces of software.

FIG. 4 shows an order system between pieces of software in a print and colorimetry control device 30. In the embodiment, the computer 10 instructs the printer 20 on the printing of an image and colorimetry of the printed image according to APL 14a (an example of print and colorimetry instructing section and instruction output section). In this case, each instruction (exclusive-use command, print command, colorimetry command, drying command, chart defining command) is supplied into the printer control IC 25, whereby each instruction is to be processed by the printer controller 250. The printer controller 250 carries out processing according to an accepted command and controls the print head 25a, head driving section 25b, carriage mechanism 25c and paper feeding mechanism 25d. Furthermore, when having accepted a command to be supplied to the colorimetry controller 260, the printer controller 250 transmits the command to the colorimetry controller 260. A combination of APL 14a and the printer control IC 25 can be referred to as a print control section. The colorimetry controller 260 carries out processing according to a command the colorimetry control IC 26 accepts via the I/F 26e and controls the colorimetry section 26a, colorimetry section moving mechanism 26b, presser plate driving mechanism 26c and drier 26d.

A calorimetric value of the printed image obtained by the colorimetry section 26a is transmitted to the printer controller 250 by the colorimetry controller 260 and to the APL 14a by the printer controller 250. More specifically, in the embodiment, the printer controller 250 serves as a contact at the printer 20 side in the transmission of command and data between APL 14a and the printer controller 250 or colorimetry controller 260. Thus, the transmission of command and data is not carried out directly between APL 14a and the colorimetry controller 260. The reason for this is that the control by the printer controller 250 is necessitated even when colorimetry or a drying process is carried out as well as when a printing process is carried out and that a command transmission path from APL 14a needs to be simplified.

2. First Embodiment

An executable embodiment using the arrangement of the print and colorimetry control device 30 will now be described. In the embodiment, for example, it is assumed that a color publication with a plurality of pages is printed. Print of image and colorimetry of a specified part of the printing results are carried out for every page. It is determined, for every page, whether the results show normal colors. When an affirmative result has been obtained, it is confirmed that the page is printed in normal colors.

Figure 5:
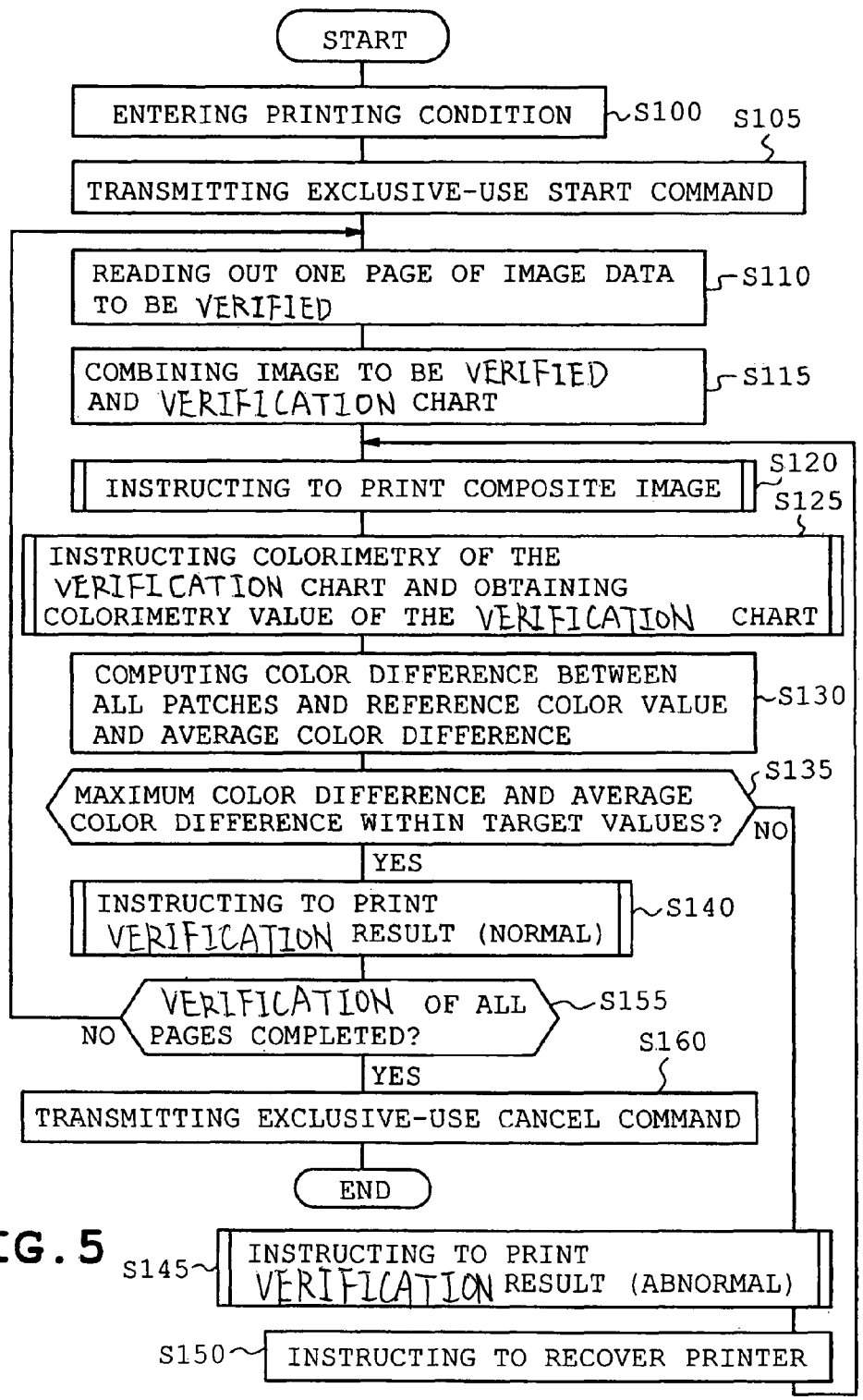
FIG. 5 is a flowchart showing a process the computer carries out based on APL.

2-1. Composite Image Printing Process/Application Side:

FIG. 5 is a flowchart showing a process the computer 10 carries out based on APL 14a. At step S100 ("step" will be eliminated hereafter), the computer 10 displays on a display 18a a print setting screen (application screen) for an image (verified image) instructed by the operation of the user to be printed, entering various printing conditions on the application screen. The verified image (an image to be verified) corresponds to the aforesaid colored publication with plural pages.

Figure 6:
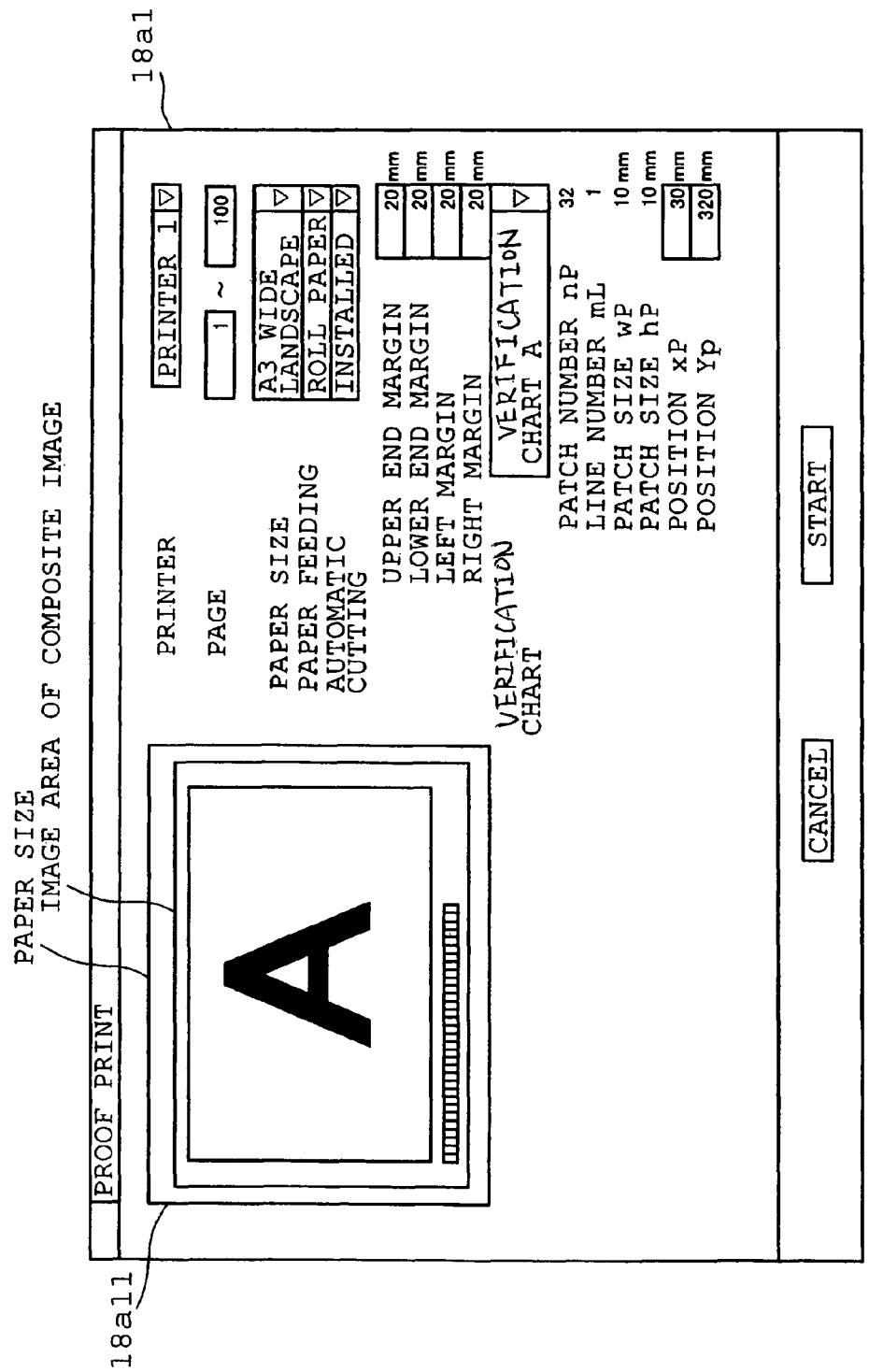
FIG. 6 shows an application screen.

FIG. 6 shows an example of application screen. Display for entering various print conditions is carried out on the application screen 18a1. In the embodiment, the print conditions to be displayed include printer type (printer 20 is selected in the embodiment), number of pages of verified image to be printed, paper size, paper feed manner, automatic cutting (cutting of paper by a cutter 25a1), margins on upper, lower, right and left ends, type of verification chart to be combined with verified image, and display for selecting or setting position of verification chart and the like. Various printing conditions are obtained according to input operation by the user. Furthermore, on the application screen 18a1, a preview display is carried out to display a range of printing paper and a composite image of verified image and verification chart disposed in the range. The horizontal and vertical size of each patch composing the verification chart (hP, wP), the number of patches per line of verification chart (nP) and number of patch lines (mL) are previously defined for every type of verification chart. Accordingly, these are automatically determined upon selection of verification chart.

The computer 10 transmits an executive-use start command to the printer 20 at S105. The executive-use start command is one of the exclusive-use commands and designates start of exclusive use of the printer 20 for execution of a sequence of jobs by the APL 14a. Accordingly, the APL 14a can be said to be an exclusive-use start instructing section. After receipt of the exclusive-use start command, the printer 20 carries out only the processes based on the instructions of the APL 14a (including instruction of PRTDRV 14b) until receiving an exclusive-use cancelling command, as will be described in detail later.

The computer 10 reads out from the HD 14 one page of image data of verified image data 14c serving as image data representative of verified image, at S110.

At S115, The computer 10 reads out from the HD 14 verification chart image data 14d serving as image data representative of the verification chart selected when the aforesaid printing conditions have been entered. And, at S115, the computer 10 further combines the verification chart image data 14d and one page of verified image data 14c read out at S110.

Figure 7:
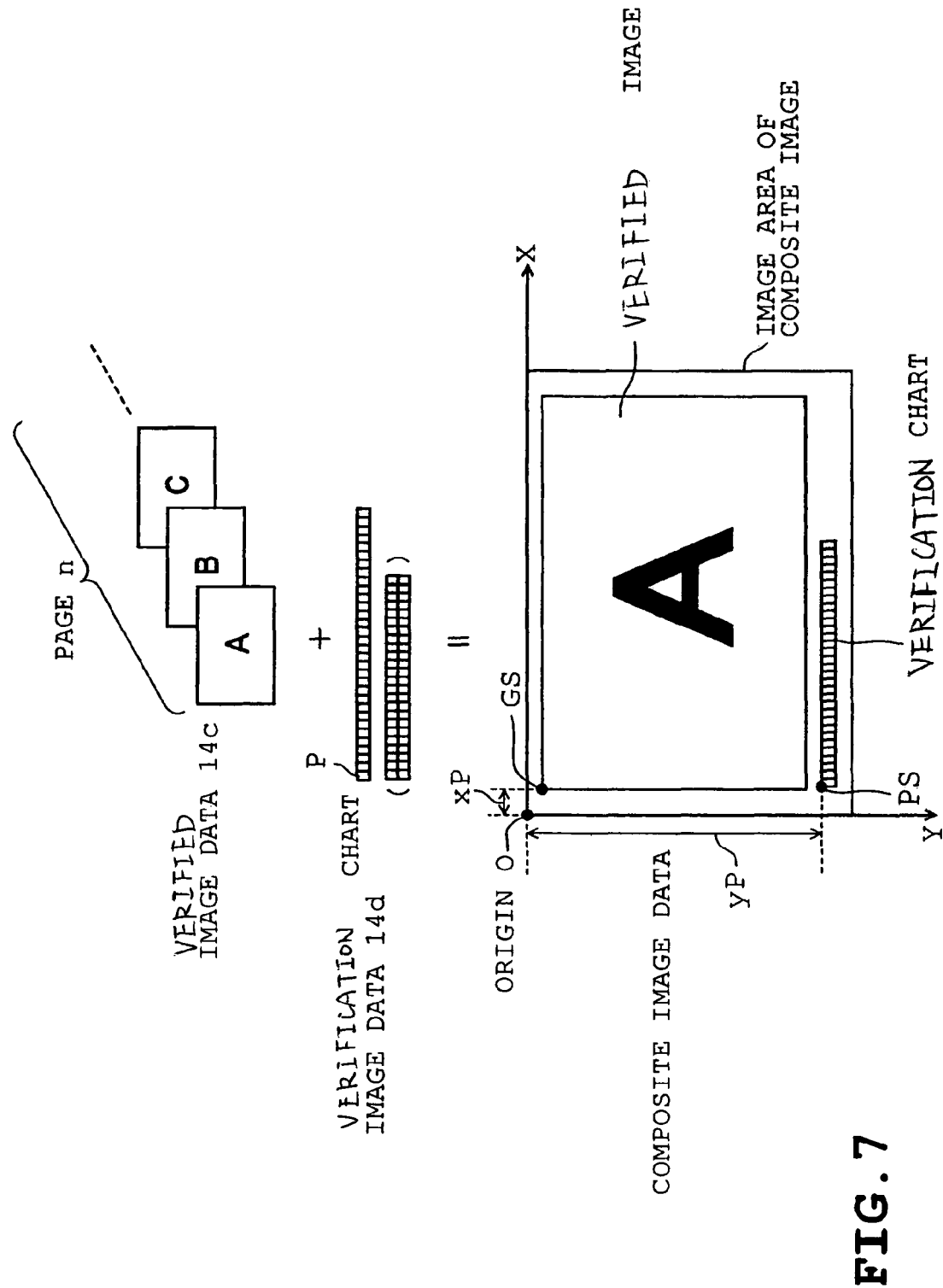
FIG. 7 shows generation of composite image.

FIG. 7 schematically shows the processes at S110 and S115. As shown in FIG. 7, the verified image data is comprised of 1 to n pages of image data. The computer 10 takes out one page of image data sequentially from the smallest number page. The computer 10 combines the taken verification image data 14c and the aforesaid verification chart image data 14d while referring to the position xP, yP of the verification chart set when the aforesaid printing conditions have been entered. The computer 10 thereby generates one page of composite image data. The verification chart is an image comprised of a plurality of color patches P. In the embodiment, a chart of a row of patches P or a chart of two rows of patches P is selectable on the application screen 18a1. FIG. 7 exemplifies a case where the verification chart image data 14d relating to the verification chart formed into one row is combined.

The position xP, yP of the verification chart indicates a starting position of the verification chart relative to the origin (a starting position of image area) of image area of the composite image. The computer 10 computes the size of image area of the composite image, paper size and upper, lower, right and left margins and comprehends the image area size on a predetermined XY coordinate system used to represent an image. The forward direction of X in the XY coordinate system corresponds to the direction of a main scan first half on the printing paper M, whereas the forward direction of Y is opposite to the paper feed direction. Next, the coordinate position corresponding to the aforesaid xP, yP in the XY coordinate system is employed as a chart combination position PS. The aforesaid verification chart image data 14d is arranged with the position PS as a starting position. One page of verified image data 14c is arranged at a position so as not to correspond with the position of the verification chart image data 14d within the image area of the composite image, whereby the combining is completed.

At S120, The computer 10 instructs the printer 20 to print based on the aforesaid composite image data.

Figure 8:
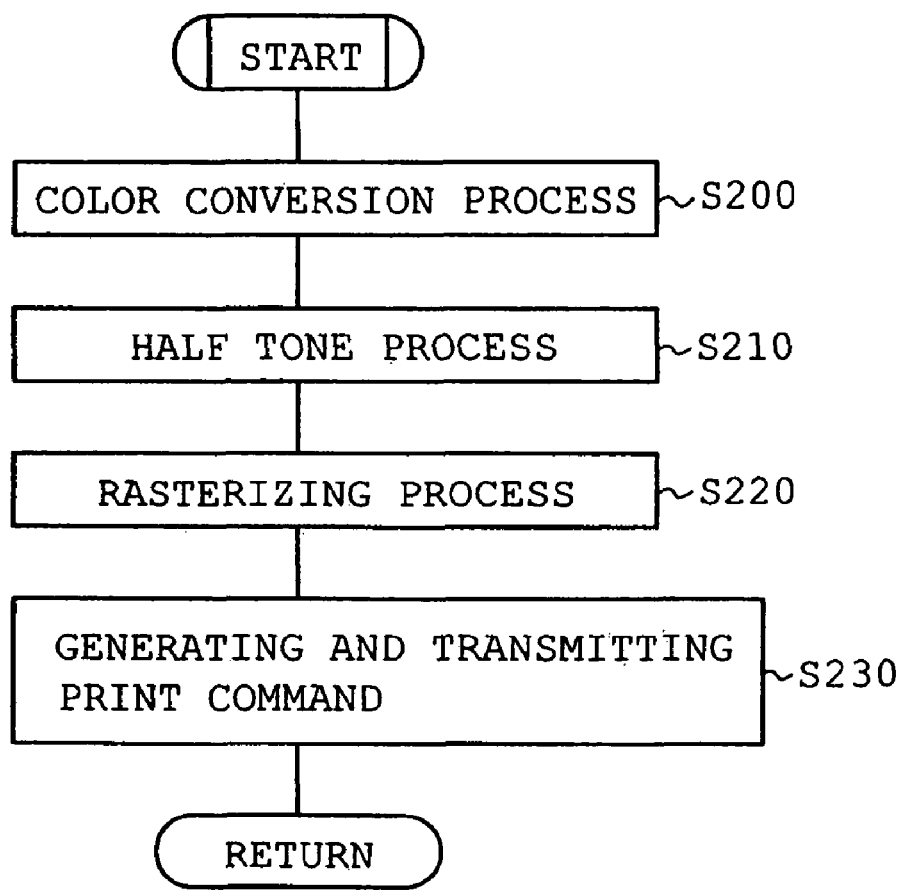
FIG. 8 is a flowchart of composite image printing instruction in detail.

FIG. 8 shows the processing at S120 in detail. The processing is carried out by PRTDRV 14b. That is, the APL 14a generates composite image data and then starts the PRTDRV 14b to supply the composite image data to the PRTRV 14b.

At S200, the PRTDRV 14b carries out a color conversion process with the composite image data as a target and converts the composite image data to image data (ink data) represented by a gradation value for every ink type (C, M, Y, K, Lc and Lm in the embodiment) used by the printer 20 for every pixel. In the embodiment, the composite image data is data (CMYK data) representing each dot matrix pixel by a gradation value of C, M and K. The PRTDVR 14b refers to a color conversion look-up table (LUT) previously registered on the HD 14, converting the CMYK data to ink data for every pixel. The color conversion LUT represents a color both by CMYK data and by ink data and causes both colors to correspond to each other. The table describes the correspondence relationship among a plurality of colors. When the composite image data is data representing each pixel by a gradation value of R, G and B (red, green and blue) according to the sRGB standard, color conversion LUT defining the correspondence relationship between the sRGB color coordinate system and ink data can be used for the color conversion process.

At S210, the PRTDRV 14b carries out a halftone process for image data processed by the aforesaid color conversion. In the halftone process, a known technique such as the dither method or error diffusion method is used to generate halftone data defining discharge/non-discharge of dot for every pixel and ink type. At S2220, the PRTDRV 14b rasterizes the halftone data thereby to rearrange data in a sequence in which the printer 20 carries out printing, thereby generating raster data (image data) for every ink type.

At S230, the PRTDRV 14b generates a print command and transmits the print command through a printer I/F 17c to the printer 20. The print command is transmitted in order that the computer 10 causes the printer 20 to carry out a printing process and means a printing area defining command, print position renewal command or print data command. The printing area defining command includes information about paper size and margins obtained at S100 and instructs an image region of the composite image within printing paper to the printer 20. The print position renewal command instructs a print start position per scan of the print head 25a. The print data command instructs an actual dot discharge process accompanied with conveyance of printing paper M and movement of the print head 25a and includes raster data for one time of scan by the print head 25a for every ink type.

Thus, after having transmitted the print command to the printer 20 at S120, the computer 10 advances to S125 to instruct colorimetry to the printer 20. The processing of the print command at the printer 20 side will be described before explanation of colorimetry.

2-2. Printing Process of Composite Image/Printer Side

Figure 9A:
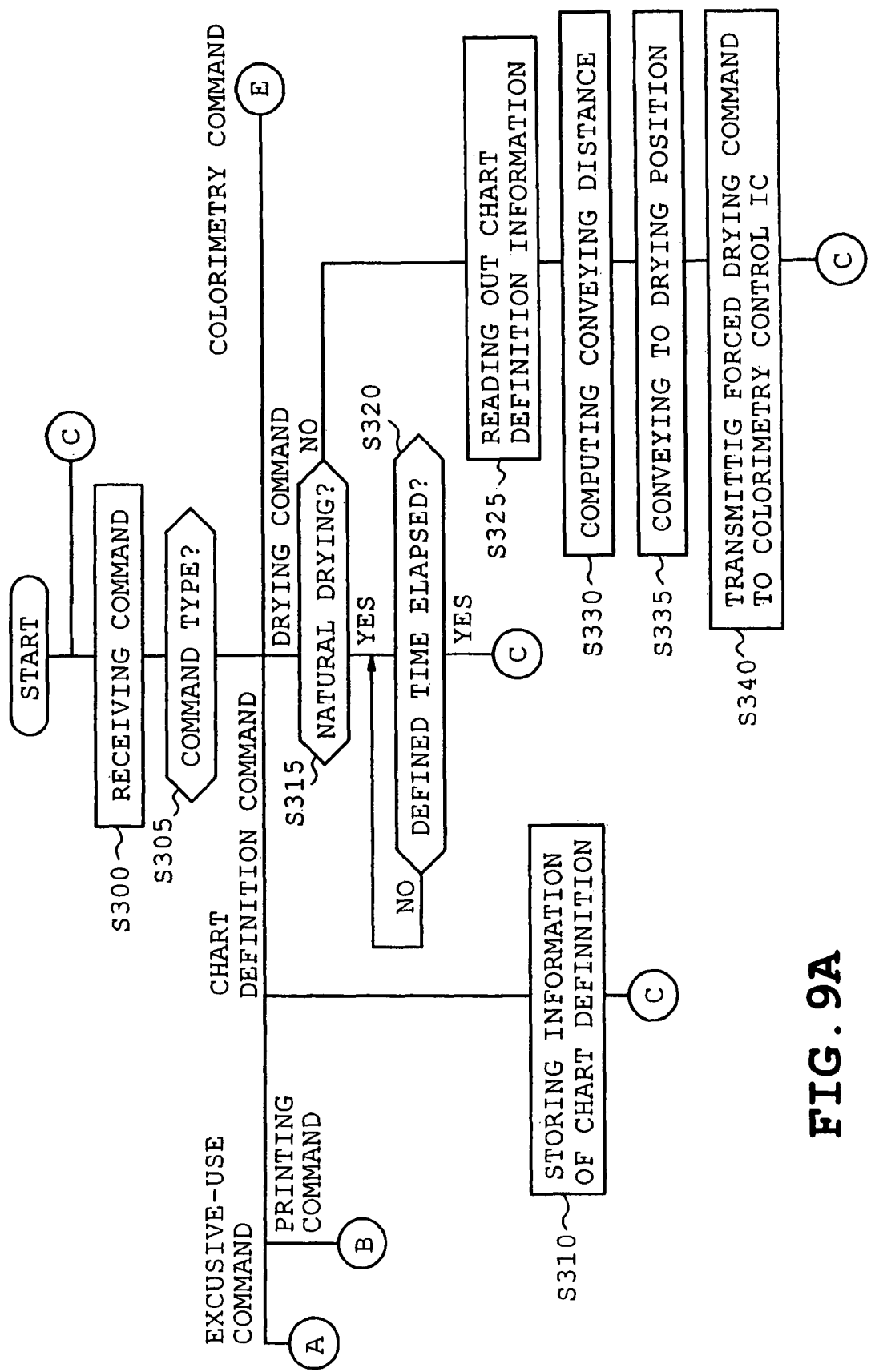
FIGS. 9A and 9B are flowchart showing part of a process to be carried out by a printer control IC.
Figure 9B:
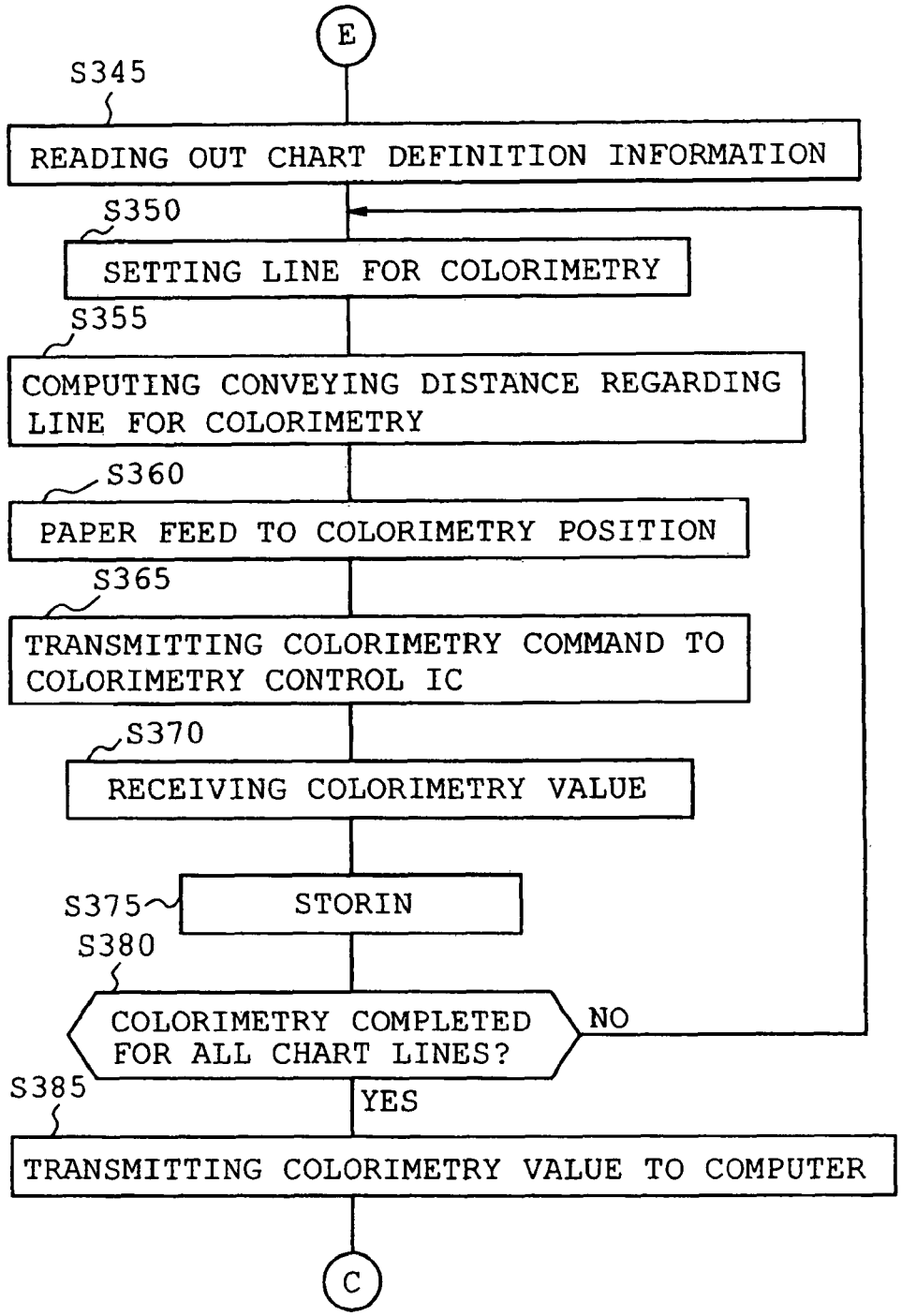

FIGS. 9A and 9B show part of a process to be carried out by a printer control IC 25 of the printer 20 based on the printer controller 250. A command to be transmitted from the computer 10 to the printer 20 is supplied via the communication I/F 24 into the printer 20 and further into the printer control IC 25, whereupon the command becomes an object to be processed by the printer controller 250. When receiving a command from the computer 10 (S300), the printer control IC 25 advances to S305 to determine whether the command is one of a exclusive-use command, print command, chart definition command, drying command and colorimetry command. Subsequent processing is branched off according to a type of the determined command.

Figure 10:
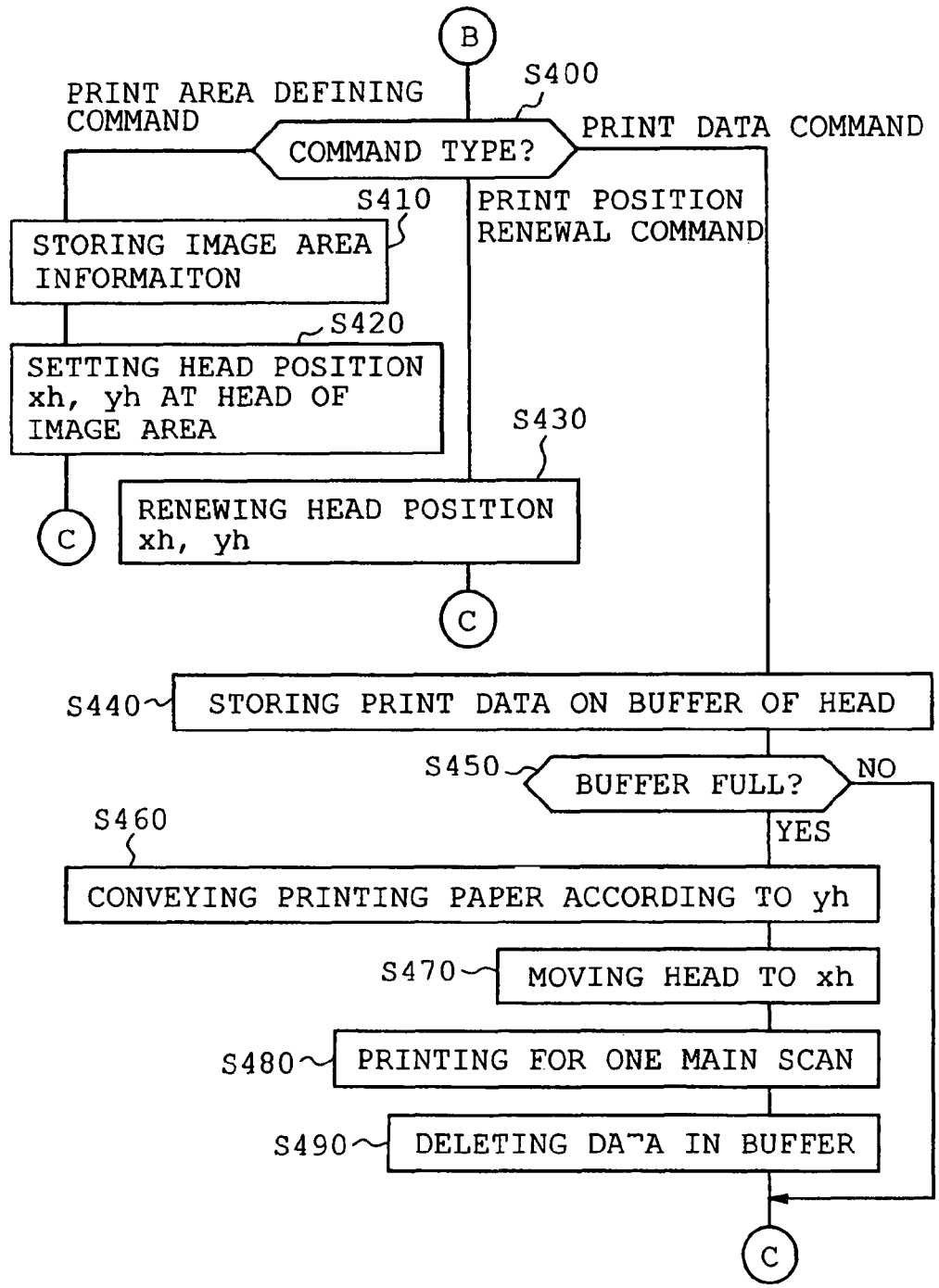
FIG. 10 is a flowchart showing part of a process to be carried out by the printer control IC.
Figure 11:
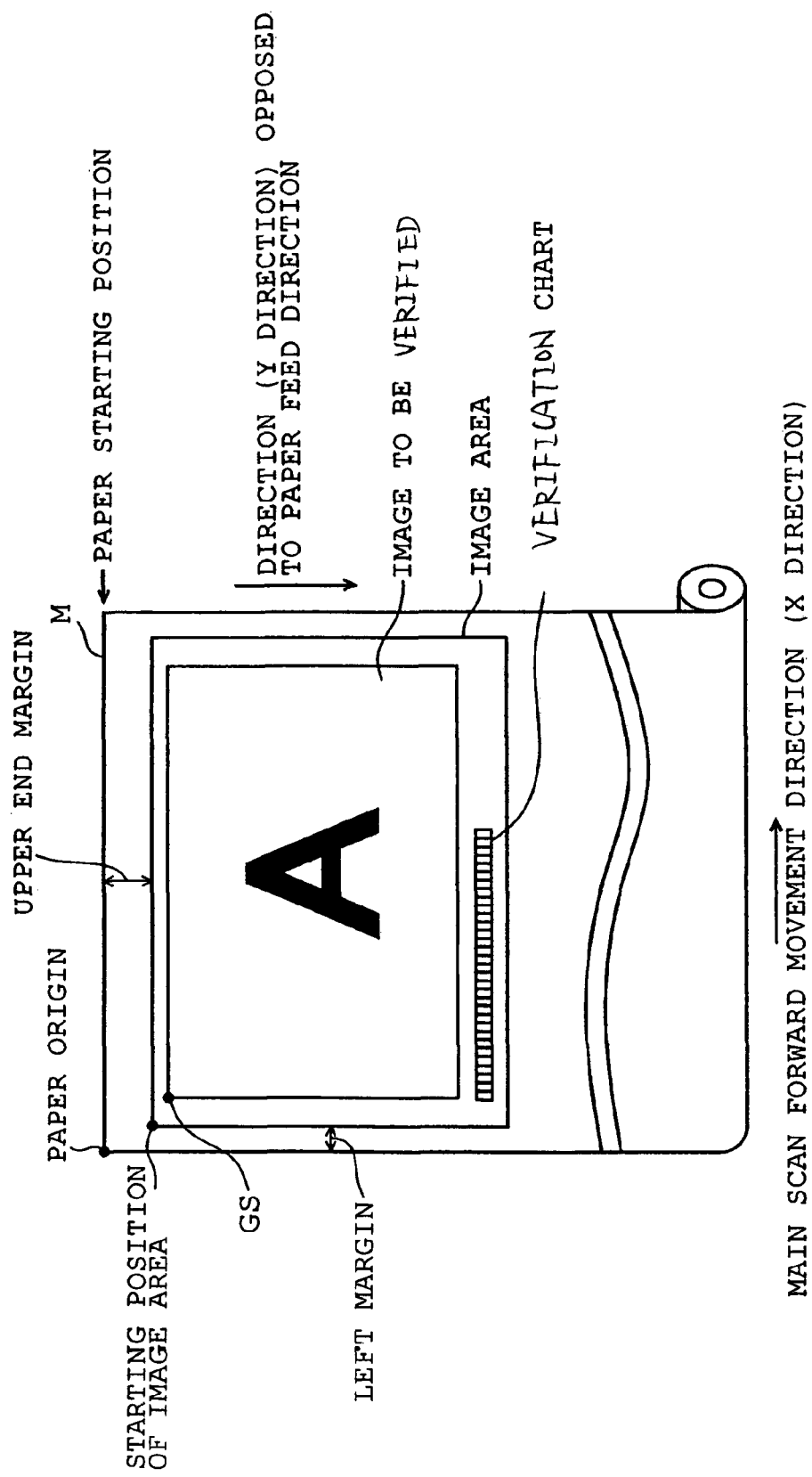
FIG. 11 shows a composite image printed in response to a print command.

FIG. 10 shows part of a process to be carried out by the printer control IC 25 based on the printer controller 250, when the print command has been received. FIG. 11 shows a composite image printed the printer 20 prints on the printing paper M according to the flowchart of FIG. 10. At S400, it is determined whether the print command is the printing area defining command, print position renewal command or print data command. Subsequent processing is branched off according to a type of the determined command. When the printing area defining command has been received, the printer control IC 25 stores image area information contained in the command on a predetermined storage area at S410. The image area information indicates paper size and upper, lower, right and left margins obtained at S100.

At S420, the value of position xh, yh of print head 25a is set at a value of starting position of the image area on the printing paper M. The position xh, yh of the print head 25a refers to a position on the paper on the basis of the paper origin. The value of xh denotes a distance from the paper origin in the main scan first half movement direction (X direction). The value of yh denotes a distance from the paper origin in the direction opposed to the paper feed direction (Y direction). In the embodiment, the paper origin refers to one of both ends of the top of the printing paper M located on the left. A starting position of the image area can be specified by the aforesaid image area information. More specifically, the starting position of the image area can be specified by a left margin (20 mm, for example) and an upper end margin (20 mm, for example). Accordingly, at S420, xh is set at the value of left margin and yh is set at the value of upper end margin.

When having received the printing position renewal command, the printer control IC 25 renews, at S430, the set values of position xh and yh of the print head 25a, based on an image starting position in the subsequent main scan instructed by the printing position renewal command. For example, information indicative of a starting position GS of the verified image is contained in a printing position renewal command to be transmitted for the initial main scan in the printing of the verified image. The printer control IC 25 renews the set values of position xh and yh to the starting position GS, based on the information. The computer 10 comprehends the starting position GS in the aforesaid XY coordinate system when having generated the composite image data. Then, for example, the computer 10 computes actual distances in the X and Y directions on the printing paper according to the distance from origin O in the XY coordinate system to the starting position, transmitting the computed distance as the printing position renewal command. At the printer 20 side, the values of the X and Y directions indicated by the printing position renewal command are added to the values of the X and Y directions set at S420 respectively, whereby the set values of the position xh and yh of the print head 25a can be renewed. Furthermore, the printing position renewal command transmitted for the initial main scan in the printing of an verification chart contains information indicative of the starting position xP and yP of the verification chart entered at S100.

When having received the print data command, the printer control IC 25 stores the print data on a buffer of the print head 25a at S440. The print data includes raster data for one time of scan for every ink type. The buffer has a storage capacity sufficient to store print data for one time of main scan. At S450, it is determined whether data is full stored on the buffer. When it is determined that data is full stored on the buffer, the printer control IC 25 carries out conveyance of the printing paper M and movement of the print head 25a according to the current set values of the position xh and yh at S460 and S470. More specifically, the printer control IC 25 transmits instruction to the paper feeding mechanism 25d in order that the printing paper M may be conveyed so that the position yh corresponds with the scan position of the print head 25a and further transmits instruction to the carriage mechanism 25c in order that the carriage may be moved along the guide rail so that the print head 25a corresponds with the position xh.

At S480, the printer control IC 25 carries out the printing corresponding to one time of scan. More specifically, raster data is transferred from the buffer to the head drive section 25b. A pattern of voltage the head drive section 25b applies to the print head 25a according to the raster data is delivered. Ink dot is discharged from the print head 25a. When finishing printing by one time of main scan, the printer control IC 25 deletes data in the buffer at S490.

The printer 20 receives a print area defining command, a plurality of printing position renewal commands necessitated to print one page of composite image and print data command form the computer 10 in a predetermined sequence. As a result, the printer 20 can print a composite image containing an verified image and verification chart as shown in FIG. 11. Accordingly, the printer 20 can be said to be provided with a print control section.

2-3. Drying of Verification Chart and Colorimetry Process/Application Side

Returning to FIG. 5, the description will be continued. At S125, the computer 10 instructs the printer 20 to carry out colorimetry of the verification chart and obtains a colorimetry value of the verification chart for which the printer 20 has carried out colorimetry. The colorimetry instruction is basically a process of generating and transmitting a chart defining command, drying command and colorimetry command.

Figure 12:
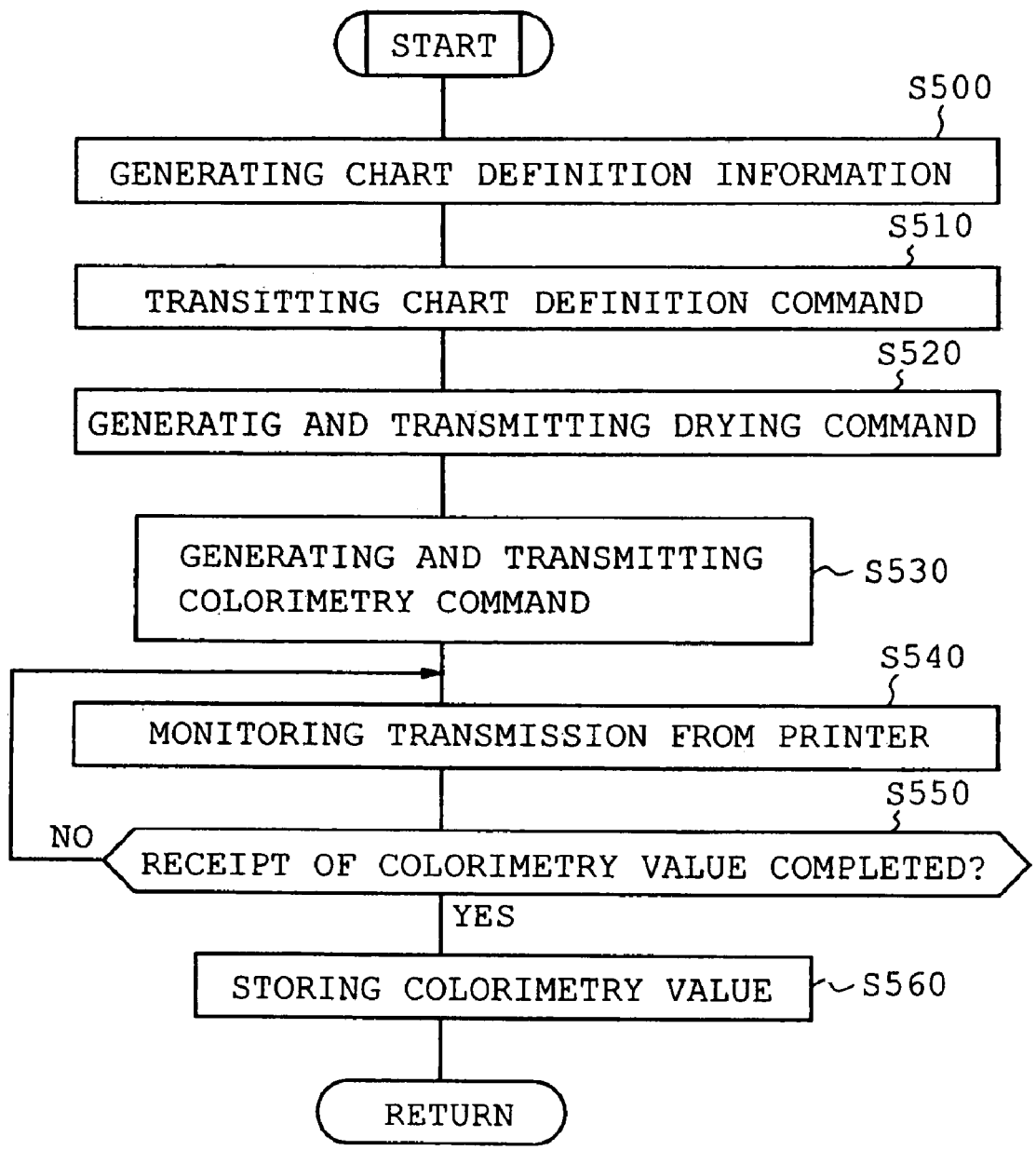
FIG. 12 is a flowchart showing colorimetry instructing process and calorimetric value obtaining process in detail.

FIG. 12 is a flowchart showing processing at S125 in detail. At S500, the computer 10 generates chart defining information (image position information) defining the position of the aforesaid printed verification chart in the printing paper M and the like. The chart defining information defines a starting position (xS, yS) and a final position (xE, yE) of the verification chart on the basis of the paper origin, a horizontal and vertical size (hP, wP) of patch, the number of patches per line of chart (nP), the number of patch lines (mL) and the like. The starting position can be defined by the upper end margin and left margin both entered at S100 and the starting position (xP, yP) of verification chart. More specifically, the sum of left margin and xP becomes xS, and the sum of upper end margin and yP becomes yS. Since the horizontal and vertical size, patch number and patch line number are previously determined for every verification chart as described above, the computer 10 reads out the horizontal and vertical size, patch number and patch line number which are stored so as to correspond to the selected verification chart. The read data is used as part of chart definition information. The final position (xE, yE) is computed suitably using the starting position (xS, yS), horizontal and vertical size (hP, wP), patch number (nP), line number (mL). The final position xE is the sum of xS and wP×nP, and yE is the sum of yS and hP×mL.

At S510, the computer 10 generates a chart defining command containing the aforesaid generated chart definition information and transmits the chart defining command via the printer I/F 17a to the printer 20. At S520, the computer 10 generates a drying command and transmits the drying command via the printer I/F 17c to the printer 20. In the embodiment, a spontaneous drying command or forced drying command is generated as the drying command. The spontaneous command instructs to dry a printed image spontaneously for a predetermined period of time and is provided with information specifying a time period of spontaneous drying. On the other hand, the forced drying command instructs to convey the printing paper M so that the verification chart assumes the position of a drier 26d and to dry the verification chart by the drier 26d. The forced drying command is provided with information specifying a temperature of a heater, wind power of a fan and the like. The computer 10 selects the spontaneous drying or forced drying and sets a drying time or the like using values previously determined according to the type of verification chart and type of printing paper which are used by the APL 14a or based on an input operation by the user.

At S530, the computer 10 generates a colorimetry command and transmits the command via the printer I/F 17c to the printer 20. The colorimetry command instructs the printer 20 to convey the printing paper M so that the verification chart assumes a movement path of the colorimetry section 26a and to carry out colorimetry for the verification chart. The colorimetry command contains various conditions under which the colorimetry section 26a is caused to carry out colorimetry, for example, information to designate an output type of colorimetric results (Lab/xyz/spectrum, etc.), the color of the slope 29a side located opposite the colorimetry section with the printing paper being interposed therebetween (referred to as "background color"; and black or white) and view angle (2° or 10°). The computer 10 sets these colorimetry conditions using values previously set in the APL 14a or based on an input operation by the user. In the processing in FIG. 12, the commands may not be generate and transmitted individually. The drying command and the colorimetry command may be combined into a single command.

At S540, the computer 10 monitors transmission of the calorimetric value from the printer 20. More specifically, after transmission of the colorimetry command, the computer 10 is on standby for the calorimetric value of the verification chart to be transmitted from the printer 20. At S550, the computer 10 determines whether colorimetric values of all the patches composing the verification chart have been received. When determining that the calorimetric values of all the patches have been received, the computer 10 stores the received calorimetric values on HD 14 at S560. After having received the calorimetric values of the verification chart from the printer 20, the computer 10 carries out the processing for verification of the printing results at S130 and subsequent steps. Before description of S130 and subsequent steps, the following will describe the processing at the printer 20 side for the chart defining command, drying command and colorimetry command.

2-4. Drying of Verification Chart and Colorimetry Process/Printer Side

As described above, a command transmitted from the computer 10 to the printer 20 is supplied via the communication I/F 24 to the printer 20 and further to the printer control IC 25, whereupon the command becomes an object to be processed by the printer controller 250.

Referring to FIG. 9 again, when having received the chart defining command, the printer controller 250 advances via S300 and S305 to S310 where chart defining information is extracted from the chart defining command. The extracted chart defining information is stored at a predetermined storage area. Since the chart defining information is necessitated in a forced drying process or colorimetry process as will be described later, the computer 10 transmits the chart defining command prior to transmission of the drying command and the colorimetry command. The printer 20 obtains the chart defining information.

When having received the drying command, the printer control IC 25 advances via S300 and S305 to S315 where it is determined whether the drying command is the spontaneous drying command. When the drying command is the spontaneous drying command, the printer control IC 25 determines whether the time for the spontaneous drying defined by the command has expired since finish of the printing of the composite image (S320). When the spontaneous drying time has not expired, the printer control IC 25 is on standby for expiration. When the spontaneous drying time has expired, the printer control IC 25 proceeds with the processing corresponding to a command received next to the drying command. On the other hand, when the drying command is the forced drying command, the printer control IC 25 reads out the aforesaid chart defining information at S330.

At S330, the printer control IC 25 computes a feed distance D1 of the printing paper M required for the forced drying of the verification chart by the drier 26d. When the forced drying is carried out, the paper M needs to be conveyed relative to the drier 26d in the course of conveyance to the colorimetry section 26a. In this sense, the feed distance D1 can be said to be part of the distance between the image for which colorimetry is to be carried out (verification chart) and the colorimetry section.

Figure 13:
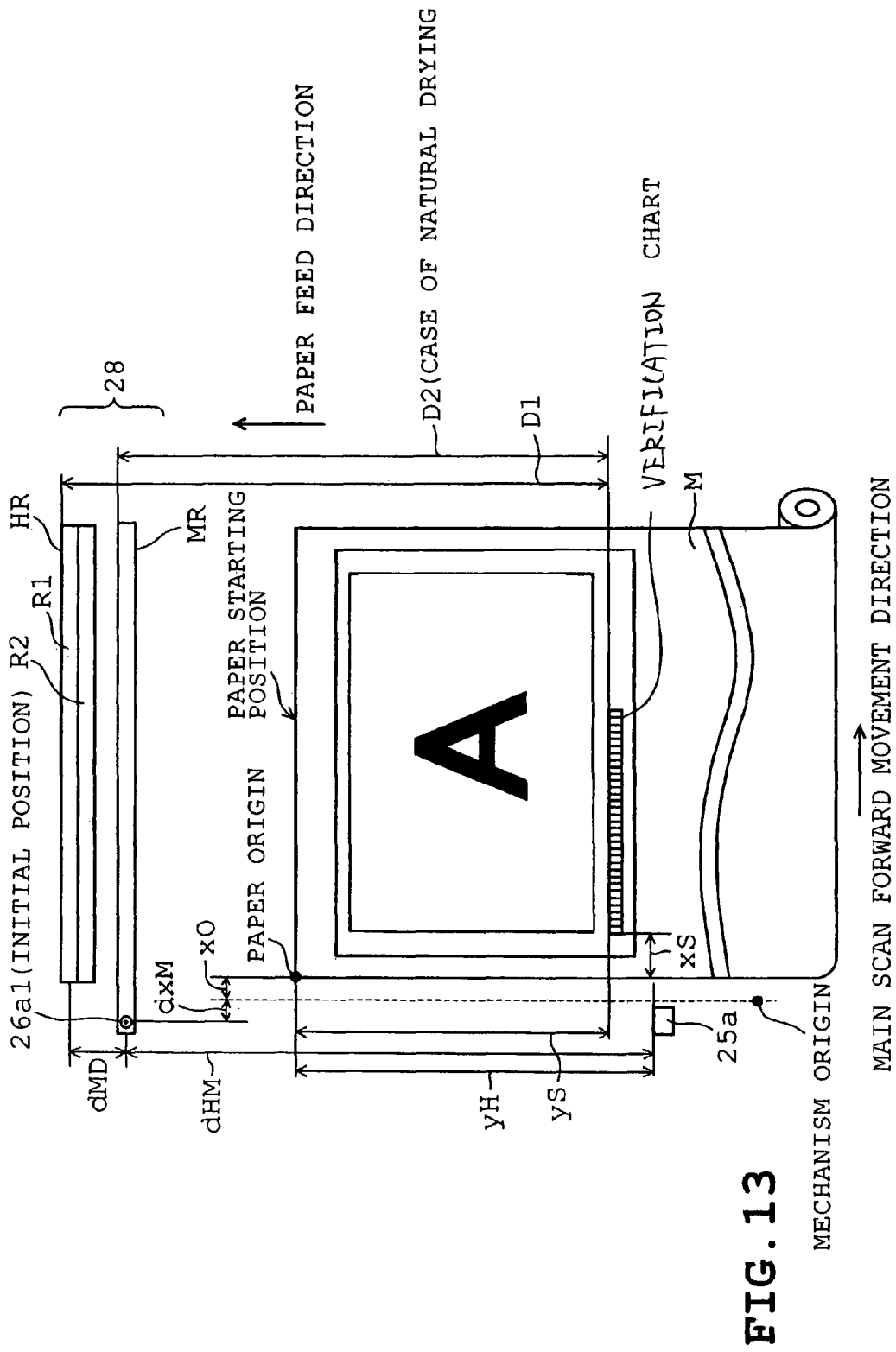
FIG. 13 shows a feeding distance of printing paper and a moving distance of a colorimetry section.

FIG. 13 shows a positional relation between the printing paper M and the colorimetry and drying unit 28 and the like after the composite image has been printed. In the figure, the colorimetry and drying unit 28 is shown as divided into a drying range HR and a colorimetry range MR. The drying range HR refers to a range the drier 26d is capable of drying at a time. The drier 26d can dry the range corresponding to a plurality of lines of patches printed on the paper M (2 lines in FIG. 13) at a time. In FIG. 13, for the sake of easiness in the explanation, the drying range HR is further divided into a range R1 and a range R2. When patches of the verification chart to be dried are included in two lines, the paper M is conveyed so that the first line is located in the range R1 and the second line is located in the range R2. On the other hand, the colorimetry range MR refers to a measurable range when the colorimetry section 26a is moved in the main scan direction. The colorimetry section 26a can measure one line of patches by movement in the main scan direction at once.

The printer control IC 25 computes the feed distance D1 by the following equation (1):

$$D1 = dHM + dMD - (yH - yS) + hP/2 \quad (1)$$

where dHM is a distance from the print head 25a to a color detecting portion 26a1 of the colorimetry section 26a in the paper feed direction. The distance dHM is basically determined previously for the sake of design of the printer 20. Actually, however, there is a possibility that a slight difference in the mounting position when the colorimetry and drying unit 28 is mounted on the inclined surface 29a. In view of this problem, the printer 20 computes the distance from the print head 25a to the colorimetry section 26a (color detecting portion 26a1). The obtained distance is referred to as "dHM." The description will proceed on condition that the printer 20 has already acquired dHM thereof. A manner of acquiring dHM will be described later.

The reference dMD refers to a distance between the colorimetry section 26a (color detecting portion 26a1) and the central position of the range R1 of the drying range HR in the paper feed direction. The distance dMD is a fixed value for the sake of design of the colorimetry and drying unit 28. The printer 20 has data of dMD as the fixed value. The reference yH refers to a current distance from print head 25a to the paper origin (paper head) in the paper feed direction. Since the printer control IC 25 is capable of computing a feed distance of the paper M based on a rotational speed of the paper feed roller or the like, the printer control IC computes the feed distance of the paper M by the paper feed mechanism 25d in the course of printing the composite image. Based on the obtained distance, the printer control IC 25 specifies the distance yH from the print head 25a to the paper head. The distance yH is medium position information. The reference yS designates the distance from the starting position of the verification chart to the paper origin in the paper feed direction. The reference hP designates a vertical (the paper feed direction) dimension of patch composing the verification chart.

At S335, the printer control IC 25 conveys the paper M in the paper feed direction by the obtained feed distance D1. In other words, the printer control IC 25 instructs the paper feeding mechanism 25d to carry out paper feed by an mount corresponding to the distance D1. As the result of the above-described conveying process, the paper M is located under the colorimetry and drying unit 28 in such a condition that the central position of the patch on the first line of the verification chart substantially corresponds with the central position of the aforesaid range R1 and that a patch on the second line, if any, has a central position substantially corresponding with the central position of the aforesaid range R2.

At S340, the printer control IC 25 transmits the forced drying command to the colorimetry control IC 26. When having received each of the above-described commands, the printer control IC 25 carries out the corresponding process. However, when having received the forced drying command, the printer control IC 25 transfers the command to the colorimetry control IC 26 since the control of the drier 26d is necessary.

Figure 14:
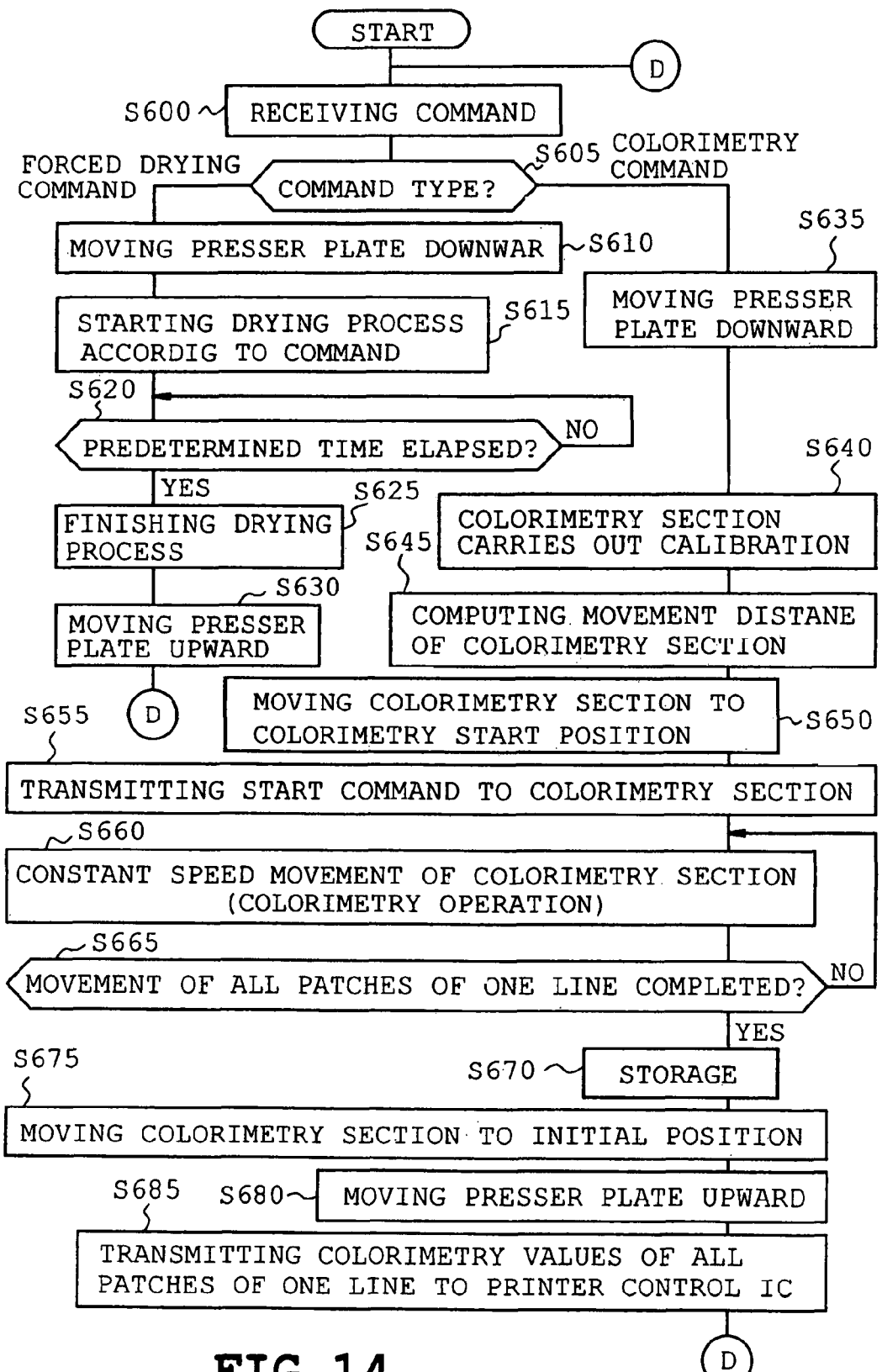
FIG. 14 is a flowchart showing a process carried out by a calorimetric control IC.

FIG. 14 is a flowchart showing a process the colorimetry control IC 26 of the printer 20 carries out based on the colorimetry controller 260. When having received a command from the printer control IC 25 (S600), the colorimetry control IC 26 determines whether the command is a forced drying command or a colorimetry command at S605. The colorimetry control IC 26 divides subsequent processing according to the command type. When having received the forced drying command, the colorimetry control IC 26 transmits instruction to the presser plate driving mechanism 26c at S610 so that the presser plate 28a is moved downward to press the paper M located under the colorimetry and drying unit 28. The purpose of pressing the paper by the presser plate 28a is to apply warm air uniformly to the paper while the floating of the paper is suppressed. Furthermore, the purpose is to make a wall so that warm air is prevented from leaking to the print head 25a side.

However, the processing at S610 is not essential and the control sequence may proceed to S615 after determination at S605, skipping S610.

At S615, the colorimetry control IC 26 instructs the drier 26d so that the drier is operated to start a drying process. More specifically, a heater and a fan of the drier 26d are controlled according to set temperature and wind power, whereby the verification chart printed on the paper M is dried.

At S620, the colorimetry control IC 26 determines whether a drying time has expired from the start of drying process. When the drying time has not expired, the colorimetry control IC 26 continues the drying process. When the drying time has expired, the colorimetry control IC 26 instructs the drier 26d to finish the drying process at S625 and further instructs the presser plate driving mechanism 26c to move the presser plate 28a upward at step S630, whereupon the paper M is returned to a conveyable state.

As described above, the drier 26d can dry patching on a plurality of lines at a time. Accordingly, even when the verification chart is composed of a plurality of patches, the paper M need not be moved by a short feed distance repeatedly. Consequently, the drying process can be finished in a shorter period of time in a simple way.

Returning to FIG. 9, the description will be continued. When having received a colorimetry command, the printer control IC 25 advances via S300 and S305 to S345 to read out the aforesaid chart defining information. Subsequently, at S350, the printer control IC 25 set a line as an object for colorimetry in the verification chart. Firstly, a first line is set as the object for colorimetry.

At S355, the printer control IC 25 computes the feed distance D2 of the paper M necessary to cause the colorimetry section 26a to carry out colorimetry for the target, based on the chart definition information or the like. The feed distance D2 for the colorimetry of a first line of verification chart differs depending upon whether the received drying command is a spontaneous drying command or a forced drying command. When the spontaneous drying command has been received, the paper M assumes the position as shown in FIG. 13 at the time of S355. On the other hand, when the forced drying command has been received, the paper M has been fed to assume such a position that the verification chart falls within the drying range HR of the drier 26d.

When the spontaneous drying command has been received, the printer control IC 25 computes the feed distance D2 for the colorimetry of a first line of verification chart using the following equation (2):

$$D2=dHM-(yH-yS)+hP/2 \qquad (2)$$

On the other hand, when the forced drying command has been received, the printer control IC 25 sets the feed distance D2 as D2=−dMD. Additionally, the paper M is fed by a vertical dimension of patch for the colorimetry of a second or subsequent line of the verification chart. Accordingly, when colorimetry is directed to a second or subsequent line of the verification chart, the feed distance D2 is set as D2=hP.

At S360, the printer control IC 25 transmits instruction to the paper feeding mechanism 25d, so that the paper M is fed by the feed distance D2 obtained at S355. When the feed distance D2 is negative, the paper M is fed in the direction opposed to the paper feed direction (hereinafter referred to as "back feed"). As the result of the above-described feeding process, the printing paper M is located under the colorimetry and drying unit 28 in such a state that the center position of the patch composing the line of colorimetry corresponds with the position of the color detecting portion 26a1 of the colorimetry section 26a in the paper feed direction.

At S365, the printer control IC 25 transmits a colorimetry command to the colorimetry control IC 26. In this case, the printer control IC 25 transmits the colorimetry command together with the chart definition information. As a result, the process according to the colorimetry can be carried out at the colorimetry control IC 26 side.

At S370, the printer control IC 25 receives a colorimetry value of the verification chart transmitted from the colorimetry control IC 26. At S375, the printer control IC 25 stores the received colorimetry value in a predetermined storage area.

At S380, the printer control IC 25 determines whether the colorimetry values of all the patch lines of the verification chart have been stored. When any unprocessed patch lines are present, the printer control IC 25 returns to S350 to set the line of colorimetry at the unprocessed line, repeating the processing from S350 to S375. On the other hand, when the colorimetry values of all the patch lines have been stored, the printer control IC 25 transmits the colorimetry values of all the patches composing the verification chart via the communication I/F 24 to the computer 10.

Subsequently, the processing carried out by the colorimetry control IC 26 which has received the colorimetry command will now be described with reference to FIG. 14. When having received the colorimetry command, the colorimetry control IC 26 advances via S600 and S605 to S635 to transmit instruction to the presser plate driving mechanism 26c, thereby causing the presser plate 28a to press the paper M under the colorimetry and drying unit 28. At S640, the colorimetry control IC 26 causes the colorimetry portion 26a to carry out calibration. In the embodiment, a white tile as a completely white plate is provided at a position opposed to the color detecting section 26a1 of the colorimetry portion 26a which is on standby at an initial position. In starting the colorimetry process, the colorimetry portion 26a is firstly caused to carry out colorimetry for the white tile. The colorimetry portion 26a compares the calorimetric results of white tile with a reference value previously stored thereon, thereby obtaining the difference of both values. The colorimetry portion 26a generates a corrected value for the calorimetric results based on the aforesaid difference. Subsequently, the colorimetry portion 26a corrects the colorimetry value obtained by the colorimetry using the corrected value and subsequently delivers the corrected colorimetry value to the colorimetry control IC 26.

At S645, the colorimetry control IC 26 computes a movement distance of the colorimetry portion 26a based on chart definition information or the like. The movement distance include a movement distance D3 from the initial position of the colorimetry portion 26a to the colorimetry starting position (the center of leading patch) and a movement distance D4 necessary for colorimetry of one line of patches of the verification chart. Movement distance D3 is obtained from equation (3):

$$D3=xS+xO-dxM+wP/2 \qquad (3)$$

where xO designates a distance from the mechanical origin of the printer 20 to the paper origin in the main scan direction. The printer 20 has a specified position previously determined as a mechanical origin. The printer 20 includes a predetermined sensor detecting the paper origin when the printing paper M has been set in the printer 20. The printer 20 then computes the distance xO from the mechanical origin to the detected paper origin in the main scan direction, storing the result in a predetermined storage area as data. Distance xO is a type of medium position information.

Reference symbol dxM designates a distance from the mechanical distance to the initial position of the colorimetry portion 26a (color detecting section 26a1) when the main scan direction is positive. Since the position of the colorimetry and drying unit 28 is fixed for the sake of design of the printer 20, the distance from the mechanical distance to the initial position of the colorimetry portion 26a is also a fixed value. The printer 20 has dxM as data of a fixed value. Since the initial position of the color detecting section 26a1 is negative relative to the mechanical origin in the example of FIG. 13, dxM takes a negative value.

On the other hand, the movement distance D4 is in the main scan direction and accordingly can be obtained from the following equation (4):

$$D4 = xE - xS \quad (4)$$

Each of the aforesaid equations may be replaced by another equation when the same result can be obtained.

At S650, the colorimetry control IC 26 delivers an instruction to the colorimetry portion moving mechanism 26b, so that the colorimetry portion 26a is moved from the initial position in a main scan second half direction by the movement distance D3. At S655, the colorimetry control IC 26 transmits a start command to the colorimetry portion 26a to instruct start of the colorimetry for one line of the verification chart. At the same time, the colorimetry control IC 26 also instructs the colorimetry portion moving mechanism 26b to move the colorimetry portion 26a in the main scan first half direction by the movement distance D4. The aforesaid start command contains various conditions for colorimetry designated by the colorimetry command (an output form of calorimetric results (Lab), a background color of the paper M, a view angle of the color detecting section, calorimetric cycle and the like). The colorimetry portion 26a is also instructed regarding these conditions. The calorimetric interval is a time period required for the colorimetry portion 26a driven by the driving mechanism 26b to pass through one patch width wP and is obtained from a moving speed of the colorimetry portion 26a and the patch width.

At S660, the colorimetry portion 26a sequentially obtains colorimetry values at a designated calorimetric interval. Since the colorimetry portion 26a is moved at a constant speed by the colorimetry portion driving mechanism 26b, colors are measured according to the aforesaid calorimetric interval, so that the position of each patch composing the verification chart corresponds with the timing of colorimetry. Consequently, a colorimetry value of each patch can be obtained. At S665, the colorimetry control IC 26 determines whether color measurement has been carried out for all the patches of one line by the colorimetry portion 26a. The determination is rendered possible when the colorimetry control IC 26 receives a signal informing of end of movement of the colorimetry portion 26a by the distance D4, for example. When determining that the colorimetry portion 26a has been caused to carry out color measurement for all patches of one line, the colorimetry control IC 26 causes the colorimetry portion 26a to output the obtained colorimetry value, storing the colorimetry value in a predetermined recording area (S670).

At S675, the colorimetry control IC 26 transmits instruction to the colorimetry portion driving mechanism 26b so that the colorimetry portion 26a is moved to the initial position. At S680, the colorimetry control IC 26 transmits instruction to the presser plate driving mechanism 26c so that the presser plate 28a is moved upward. At S685, the colorimetry control IC 26 transmits to the printer control IC 25 the colorimetry values of all the patches in one line of the verification chart. As described above, the printer control IC 25 side receives colorimetry values of the verification chart transmitted from the colorimetry control IC 26, at S370.

Thus, all the chart definition command, drying command and colorimetry command are firstly transmitted from the computer 10 to the printer control IC 25 of the printer 20, whereby the paper M is fed by a necessary distance at times suitable for a drying process and a colorimetry process. Furthermore, a drying command (forced drying) and a colorimetry command are transmitted from the printer control IC 25 to the colorimetry control IC 26, whereupon the drying process by the drier 26d can be carried out for the paper M which has been fed to a suitable position by the control of the printer controller 250, and the colorimetry can be moved so that the colorimetry process can be carried out. Since the printing command and all other commands are necessary for the printer controller 250, the computer 10 transmits all the commands to the printer control IC 25 so that sequential processing from printing to colorimetry can reliably be carried out by the printer 20. Accordingly, the printer 20 can be said to be provided with a determining section, feeding section and colorimetry control section. More specifically, the printer control IC 25 and colorimetry control IC 26 serve as the determining section. The printer control IC 25 and paper feeding mechanism 25d serve as the feeding section. Furthermore, the command transmission process can be simplified since the computer 10 need not select as the destination the printer control IC 25 or the colorimetry control IC 26 for every command.

2-5. Verification Process

Returning now to FIG. 5, the description will be continued. At S130, the computer 10 (APL 14a) computes a color difference ΔE between the calorimetric value of each patch of the verification chart obtained from the printer 20 and a reference color value (Lab value) 14f and further computes an average value (average color difference ΔEav) of color difference ΔE of each patch. The HD 14 stores, as data of reference color value 14f, ideal color values regarding each patch composing the verification chart selected by the user. Accordingly, the reference color value 14f is read from the HD 14 thereby to be compared with the colorimetry value of the corresponding patch.

At S135, the computer 10 evaluates the color difference ΔE and average color difference ΔEav of each patch, thereby determining whether the verified image of the composite image have been printed in ideal colors. More specifically, the computer 10 determines whether the maximum value (maximum color difference ΔEmax) of color difference ΔE of each patch is equal to or smaller than a predetermined target value (color difference). The computer 10 further determines whether the average color difference ΔEav is equal to or smaller than a predetermined target value (color difference). The target value to be compared with the maximum color difference ΔEmax may be color difference ΔE=8.0, for example. The target value to be compared with the average color difference ΔEav may be color difference ΔE=3.0, for example. When both maximum color difference ΔEmax and average color difference ΔEav are equal to or smaller than respective target values, the colors of the verified image printed are considered to be normal together with the verification chart. The computer 10 then advances to S140. On the other hand, when either one or both of the maximum color difference ΔEmax and the average color difference ΔEav are larger than the respective target values, the colors of the verified image are considered to be abnormal. The computer 10 then advances to S145. Any one of color difference color-difference formula CIE1976, CIE1994 and CIE2000 may be used for computation of color difference ΔE. The computer 10 carrying out the processing at S130 and S135 can be said to be provided with a determining section. More specifically, the APL 14a ca be said to be a determining section.

At S140, the computer 10 instructs the printer 20 to print an verification result indicating that the printing at a predetermined position within the image area of the composite image is normal.

Figure 15:
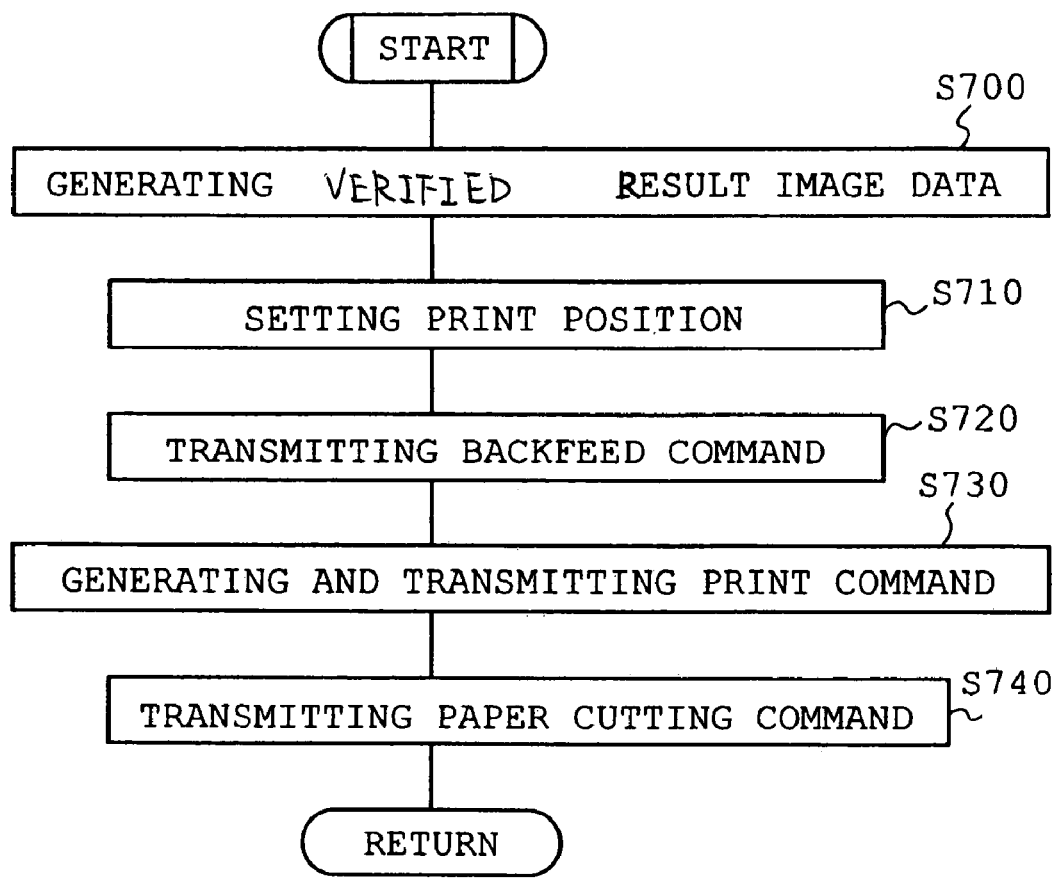
FIG. 15 is a flowchart showing verification result printing process.
Figure 16:
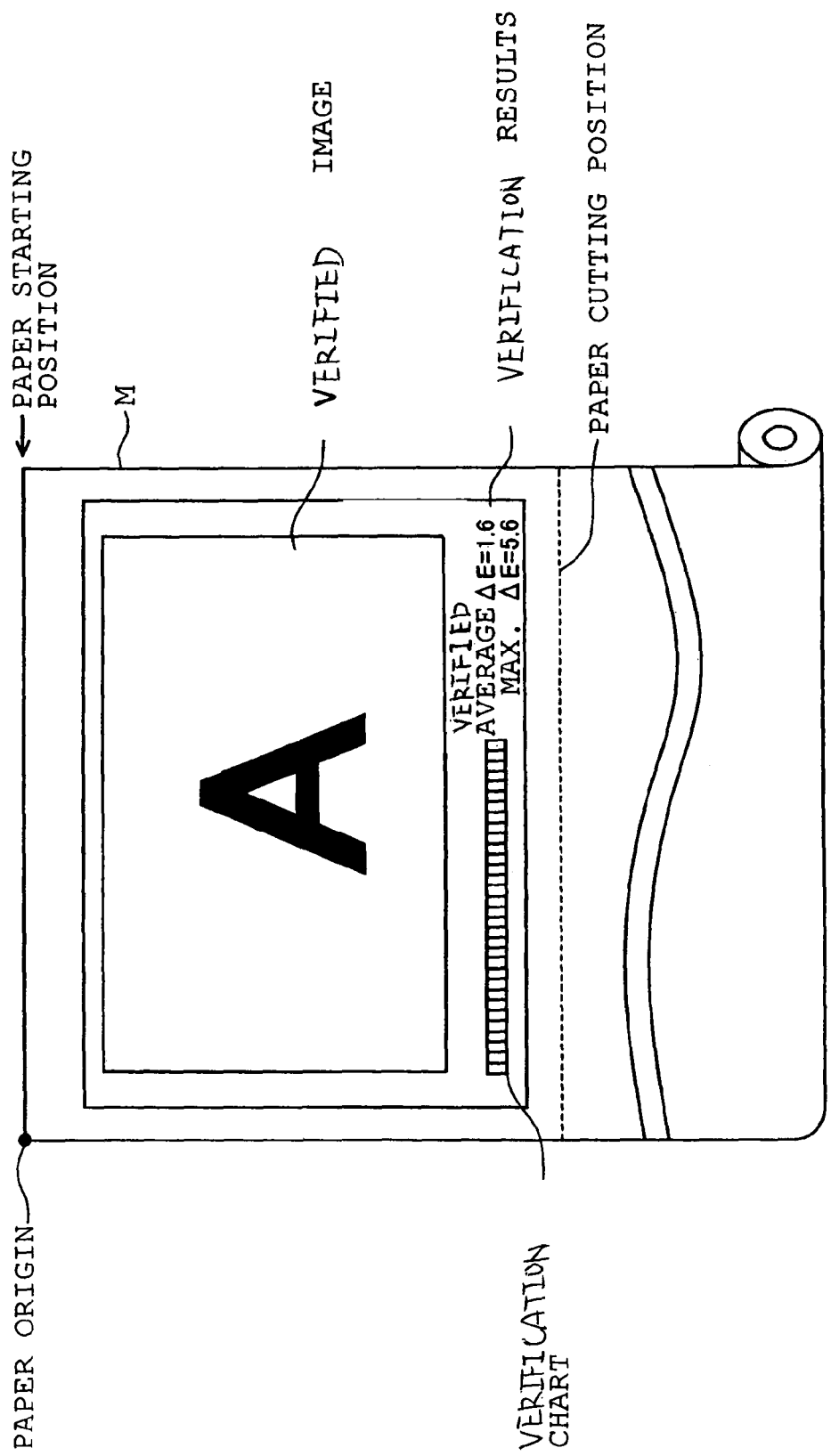
FIG. 16 shows a composite image after print of verification result.

FIG. 15 shows processing at S140 in detail. FIG. 16 shows an example of verification result printed by the printer 20 according to the instruction at S140.

At S700, the computer 10 generates verification result image data representing the verification result. For example, the computer 10 generates data of a text describing "Verified average ΔE=☐ and maximum ΔE=☐" (each ☐ is to be replaced by aforesaid average color difference ΔEav and maximum color difference ΔEmax respectively) and converts the text data to RGB image data.

At S710, the computer 10 sets a printing position of the verification result. The printing position of the verification result is a distance to the head position of verification result in the X and Y directions on the basis of the origin of the image area of the aforesaid composite image. The verification result is to be printed at a position which is within the image area of the composite image and which does not overlap the verified image and the verification chart. Accordingly, the computer 10 can automatically select and set the printing position of the verification result, referring to the positions of the verified image and of the verification chart. Alternatively, the printing position may be set as instructed by the user.

At S720, the computer 10 transmits a backfeed command to the printer 20 to instruct to backfeed the paper M. At S730, the computer 10 generates a print command based on the verification result image data and transmits the print command to the printer 20. Image processing is applied to the verification result image data so that raster data for printing the verification result is generated. The image processing includes a color conversion process, halftone process, rasterizing process and the like. Furthermore, the computer 10 generates position information based on the set print position of the verification result, the upper end margin of the paper M and the left margin. The position information defines a print start position of the verification result on the paper M on the basis of the paper origin. The computer 10 then generates raster data and a print command containing the position information. The print command is transmitted to the printer 20.

At S740, the computer 10 transmits a paper cutting command to the printer 20. The paper cutting command is provided for cutting the paper M on which the verification result has been printed, at a position (paper cutting position) corresponding to the paper size starting from the paper head by a cutter 25a1.

The printer 20 side will be described in relation to the commands transmitted at S720 to S740 respectively. When having received the backfeed command, the printer 20 transmits instruction to the paper feeding mechanism 25d in order that the paper M may be fed back so that the paper head is returned to a predetermined paper-feed initial position while the verification chart is located within the range of colorimetry. When a print command has been received, instruction is transmitted to the paper feed mechanism 25d and the carriage mechanism 25c so that feed of the paper M and movement of the print head 25a are carried out so that the print head 25a is located at the verification result print start position indicated by the position information of the verification result contained in the command. Furthermore, the head driving section 25b is also controlled so that the verification result is printed from the start position based on the aforesaid raster data. In the back feed, the paper M need not be returned until the head thereof assumes the paper-feed initial position but may be returned directly from the position during colorimetry so that the verification result print start position is moved under the main scan path of the print head 25a.

When having received a paper cutting command, the printer 20 transmits instruction to the paper feeding mechanism 25d in order that the paper M may be fed so that the position of the cutter 25a1 corresponds with the aforesaid paper cutting position and further transmits instruction to the print head 25a so that the cutter 25a1 protrudes outward to a position where the blade edge of the cutter 25a1 reaches the paper M. Furthermore, the printer 20 transmits instruction to the carriage mechanism 25c to move the print head 25a (cutter 25a1) reciprocally. As a result, as shown in FIG. 16, printed paper on which the verified image, the verification chart and the verification result are printed in one image area is cut from the roll. The cutter 25a1 is retracted inside the print head 25a when unused. Thus, the cutter 25a1 is taken out only when the paper is to be cut.

The description will be returned to FIG. 5. On the other hand, at S145, the computer 10 instructs the printer 20 to print the colorimetry result indicating that the composite image has a defect at a predetermined position within the image area. For example, the computer 10 causes the printer 20 to print the verification result that "Unverified average ΔE=☐ and maximum ΔE=☐". Since the processing at S145 differs from S150 in characters of verification result to be printed, the description will be eliminated.

At a step next to S145, the computer 10 instructs the printer 20 to carry out a predetermined recovering operation at S150. More specifically, since the color reproducibility of the printer 20 differs from an ideal characteristic, the cause for the difference will be resolved. Various recovering manners are considered. For example, the printer 20 is caused to clean the nozzle of the print head 25a so that the normal color reproducibility is recovered. Of course, the computer 10 may be arranged to cause the display 18a to display a predetermined warning, whereby the user is urged to carry out necessary maintenance for the printer 20.

At a step next to S150, the computer 10 returns to S120 to instruct the printer 20 to print the last printed composite image again, repeating the processing at S120 and subsequent processing. At S155, the computer 10 determines whether normal verification result has been obtained from all pages of verified image data 14c stored on HD 14. When one or more unprocessed pages remain, the computer 10 returns to S110 to read out image data of one of the unprocessed pages from the verified image data 14c.

On the other hand, when normal verification results have been obtained from all the pages, the computer 10 (APL 14a) transmits the exclusive-use canceling command to the printer 20 at S160 to cancel the exclusive-use state of the printer 20, thereafter ending the processing of FIG. 5. Accordingly, the APL 14a can be said to be an exclusive-use cancel instructing section.

According to the embodiment, the user can obtain the print results of all the pages of verified images represented by colored publication containing plural pages while the normality of printed colors have been verified and the results are cut into the pages.

2-6. Exclusive Use of Printer

Figure 17:
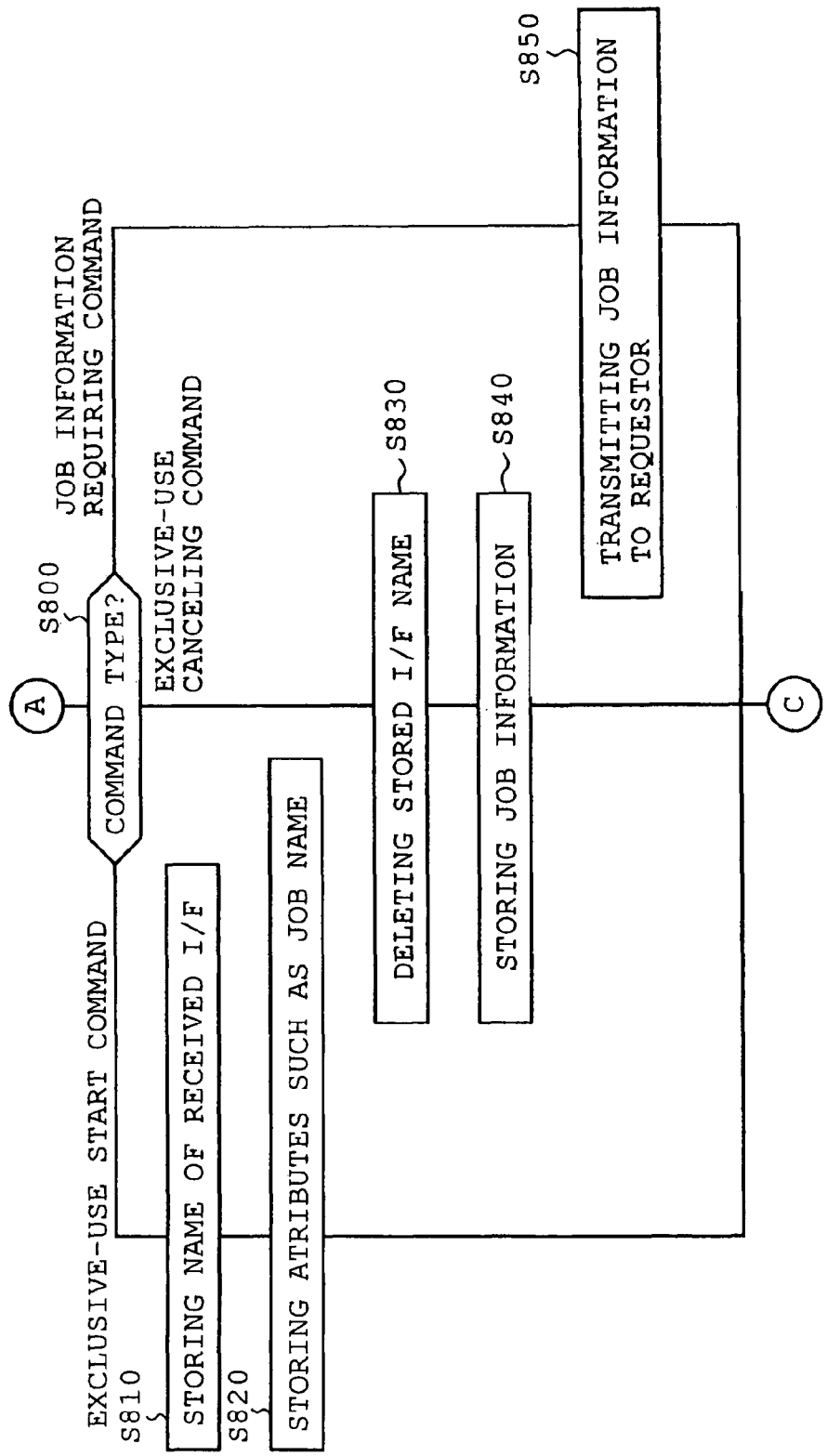
FIG. 17 is a flowchart showing a process the printer carries out in response to exclusive use command.

Next, the following will describe the exclusive use of the printer 20 by the computer 10 with use of the aforesaid exclusive use command. FIG. 17 is a flowchart showing a process carried out by the printer having received an exclusive-use command from the computer 10 (APL 14a). At S800, the printer 20 determines whether the received exclusive-use command is an exclusive-use starting command, an exclusive-use canceling command or a job information requiring command. Subsequent processing is branched off according to a type of the determined command.

When having received the exclusive-use starting command, the printer 20 stores the name of I/F having received the command (or ID for identifying I/F) in a specified storage area. I/Fs other than the communication I/F 24 used for communication with the computer 10 are eliminated in FIG. 1. It is understood that the printer 20 is provided with I/Fs used for communication with external instruction output source (PC or program) except for the APL 14a, other than the communication I/F 24. The printer 20 previously applies numbers to respective I/Fs so that the numbers serve as the I/Fs. Since the exclusive-use starting command has been received via the communication I/F 24 at S810, the printer 20 stores the previously applied number n as the I/F name in a specified storage area.

Each interface provided in the printer 20 is means or communication system interposed between an instruction output source and the printer 20 for realizing communication in a one-to-one relationship. Accordingly, the interfaces include a software I/F used for data transmission between an instruction output side program and the printer 20 side program as well as a hardware I/F such as a USB connector used for connecting a PC to the printer 20. When communication is carried out among a plurality of PCs or programs via a connector in compliance with the TCP/IP system provided in the printer 20, an IP address or port allocated to the instruction output source is included in the concept of I/F.

At S820, the printer 20 stores attribute information provided in the exclusive-use starting command in a predetermined storage area. The attribute information includes a job name assigned to a sequential processing from printing to colorimetry the APL 14a requires the printer 20 to carry out. When transmitting an exclusive-use starting command, the APL 14a informs the job name, user name and PC host name and the like contained in the command.

When having received an exclusive-use canceling command, the printer 20 deletes the I/F name stored in the aforesaid specified storage area at S830. After the deletion, the printer 20 stores job information indicating the contents of processing carried out according to each command in a period from receipt of the exclusive-use starting command to receipt of an exclusive-use canceling command (S840). The job information includes a time period necessary for printing to completion of colorimetry, the number of pages of printed matter, a used length of roll M, an amount of ink used and the contents of verification result. The job information may be stored so as to correspond to the job name stored at S820.

Figure 18:
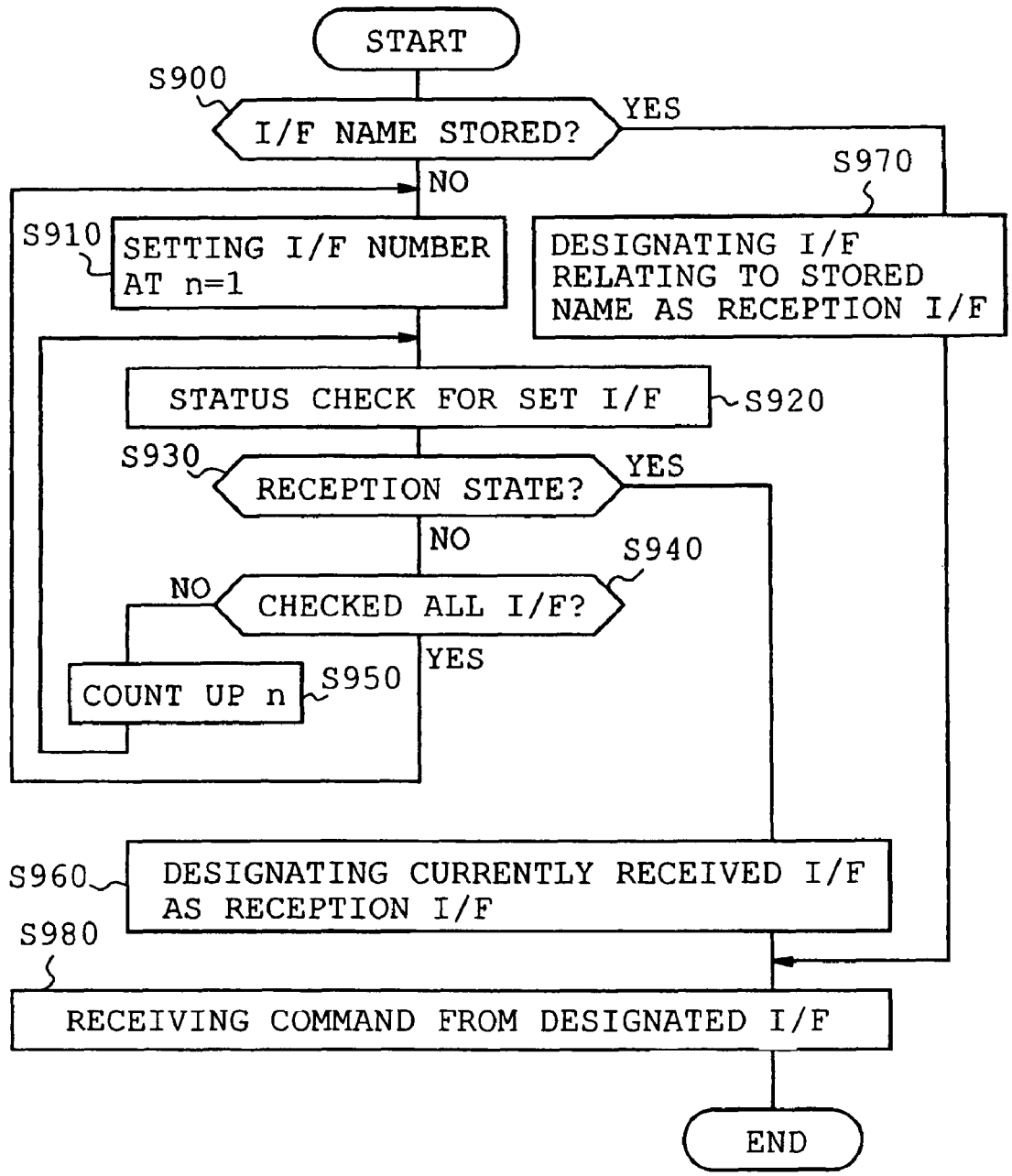
FIG. 18 is a flowchart showing command receiving process of the printer.

FIG. 18 is a flowchart showing command receiving process of the printer 20. The printer 20 normally determines whether an I/F name is stored in the specified storage area (S900). When the I/F name is stored, the printer 20 designates the stored I/F name as a receiving I/F (S970) to receive a command only from the designated I/F (S980). More specifically, after having received an exclusive-use starting command from any instruction output source, the printer 20 stores the I/F name from which the exclusive-use starting command has been received and receives an external command using only the I/F whose name has been stored. This limitation of I/F is continued until an exclusive-use canceling command is received via the I/F whose name has been stored and deletes the I/F name from the specified storage area.

Thus, the APL 14a transmits the exclusive-use starting command to the printer 20 (S105) and can dominate the printer 20 until an exclusive-use canceling command is transmitted (S160). Consequently, all the processing from the printing of a first composite image to colorimetry of the last composite image can continuously be carried out without interrupt of a job from the other instruction output source connected to the printer 20. In particular, it is expected that several hours are required to accomplish the printing and colorimetry of verification chart regarding all of a plurality of pages of the verified images. It has been conventionally difficult to dominate a printer for such a long time period. However, since the printer can be dominated in the embodiment, a printed matter having no relation with the verified images can be prevented from creeping into pages of the verified images.

When determination is in the negative at S900, that is, when no exclusive-use starting command has not been received from any instruction output source, the printer 20 can receive a command from any I/F in order of arrival. More specifically, the printer 20 sets a status-checked I/F at I/F No. 1 (S910) and checks the status of the set I/F (S920). When it is determined that external data is being received (Yes at S930), the I/F under receipt is designated as a receiving I/F (S960) and external commands are accepted via the designated I/F. On the other hand, when the determination is in the negative at S930, it is determined whether the status check has been completed for all the I/Fs starting with No. 1 (S940). When the status check has not been completed, the setting of I/F number to be checked is counted up by 1 (S950) and the printer 20 then returns to S920. When the status check has been completed for all the I/Fs (Yes in S940), the printer 20 returns to S910 to repeat the status check from the I/F No. 1.

Return to FIG. 17, when having received a job information requiring command, the printer 20 transmits the required job information to a requester. The job information requiring command is a specified job name of job information to be required. At the printer 20 side, job information is extracted which is stored in a storage area so as to correspond to the job name specified by the received job information requiring command. The extracted job information is transmitted to the computer 10. As a result, at the computer 10 side, various pieces of information can be obtained regarding the specified job relating to sequential processing from the printing of an image to colorimetry.

It can be considered that after transmission of an exclusive-use starting command by the APL 14a, an error occurs in the computer 10 or APL 14a such that the APL 14a cannot transmit an exclusive-use canceling command to the printer 20. When a predetermined time has expired after receipt of the exclusive-use starting command, the printer 20 may generate a reset signal. In this case, the predetermined time may be a time period set for accomplishing the printing of all the verified images and colorimetry of verification chart. When the reset signal has been generated, the printer 20 regards the condition as the same as when an exclusive-use canceling command has been received. Accordingly, the printer 20 deletes the I/F name stored in the specified storage area. In addition to or instead of the determination based on the lapse of the predetermined time, the printer 20 may generate the reset signal and delete the I/F name when the user has applied a predetermined operation to the printer 20. This arrangement can prevent the printer 20 from being unduly dominated by a single instruction output source. Furthermore, the printer 20 can readily be canceled from the exclusive use by the APL 14a at a time desired by the user.

3. Second Embodiment

A second embodiment which can be carried out using the arrangement of the print and colorimetry control device will be described. Since the first and second embodiments share many parts in common, differences of the second embodiment from the first one will be described here.

Figure 19:
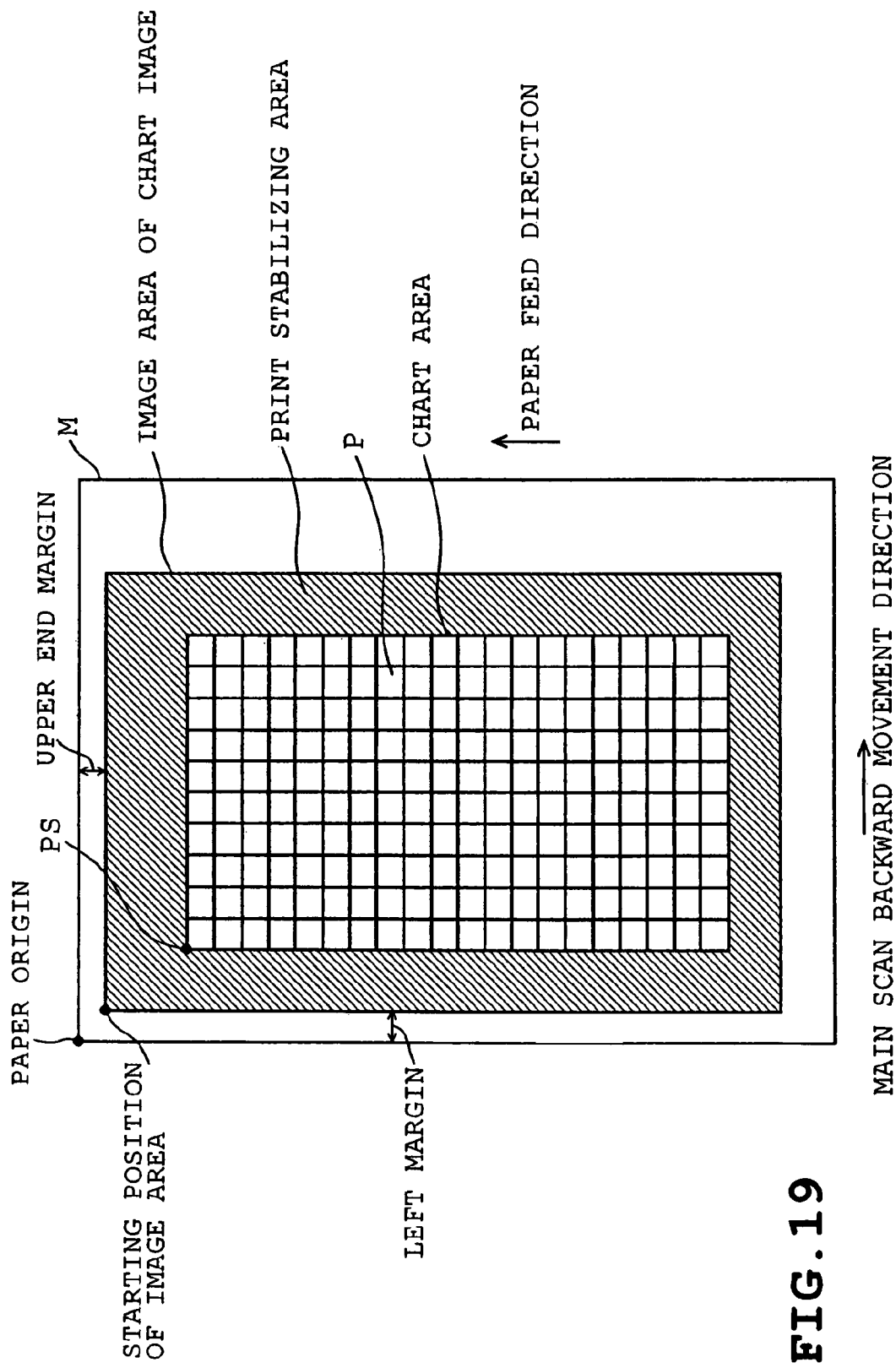
FIG. 19 shows a chart image printed in response to a print command.

FIG. 19 shows a chart image the printer 20 has printed on the paper M in the second embodiment. The chart image includes a chart area composed of a plurality of color patches P lined up in the main scan direction and in the paper feed direction and a print stabilizing area encompassing the chart area. The computer 10 causes the printer 20 to carry out sequential processing from the printing of the chart image to the colorimetry of each patch P.

Figure 20:
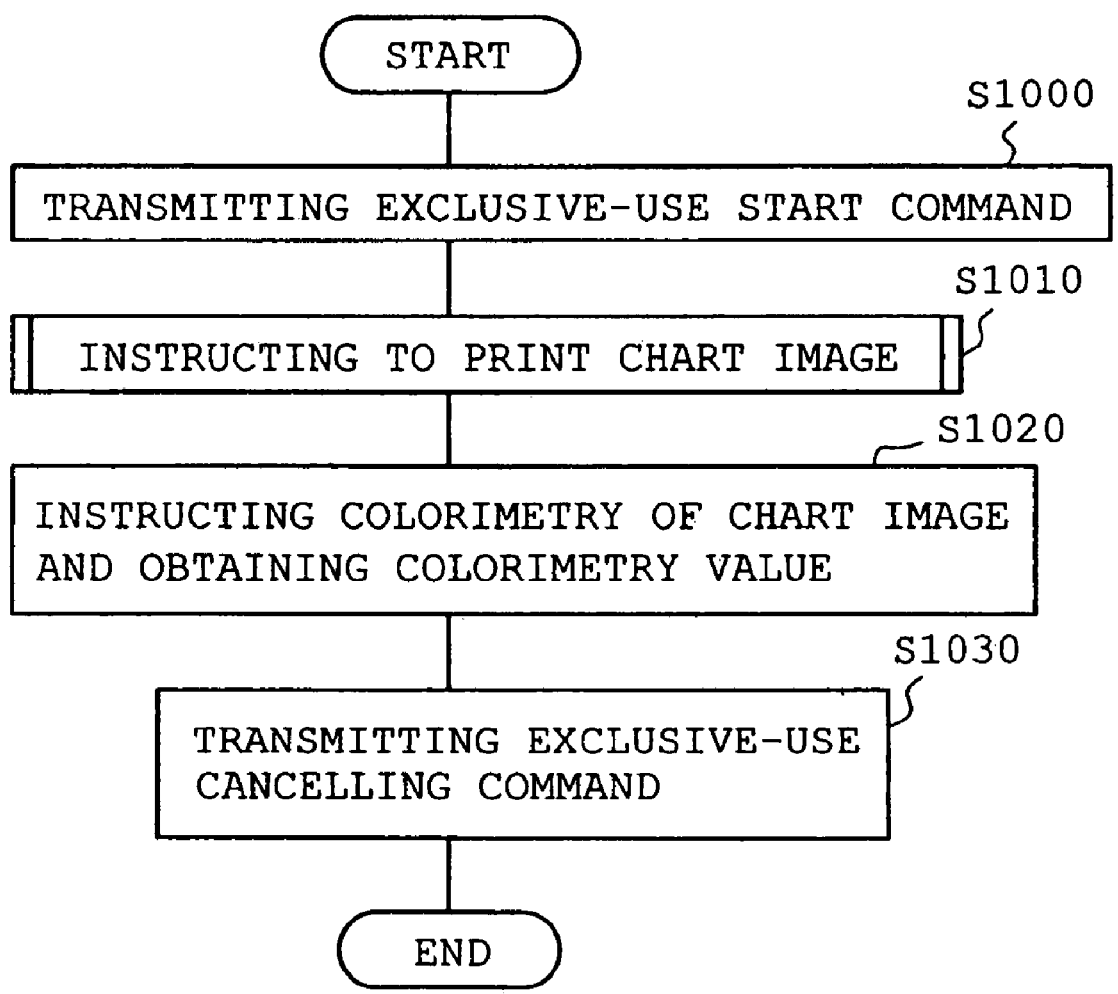
FIG. 20 is a flowchart showing a process the computer carries out based on APL.

FIG. 20 is a flowchart showing a process the computer 10 carries out based on the APL 14a. When compared with FIG. 5, FIG. 20 differs from FIG. 5 in that no verification process based on the result of colorimetry is carried out. Furthermore, no process of combining images is necessitated. The computer 10 causes the printer 20 to print a chart image on the basis of image data representative of a previously prepared chart image. The computer 10 transmits the exclusive-use starting command and the exclusive-use canceling command to the printer 20 and dominates the printer for the period between transmission of both commands as in the first embodiment. After having transmitted the exclusive-use starting command to the printer 20 (S1000), the computer 10 instructs the printer 20 to carry out printing on the basis of the chart image data 14e at S1010.

Figure 21:
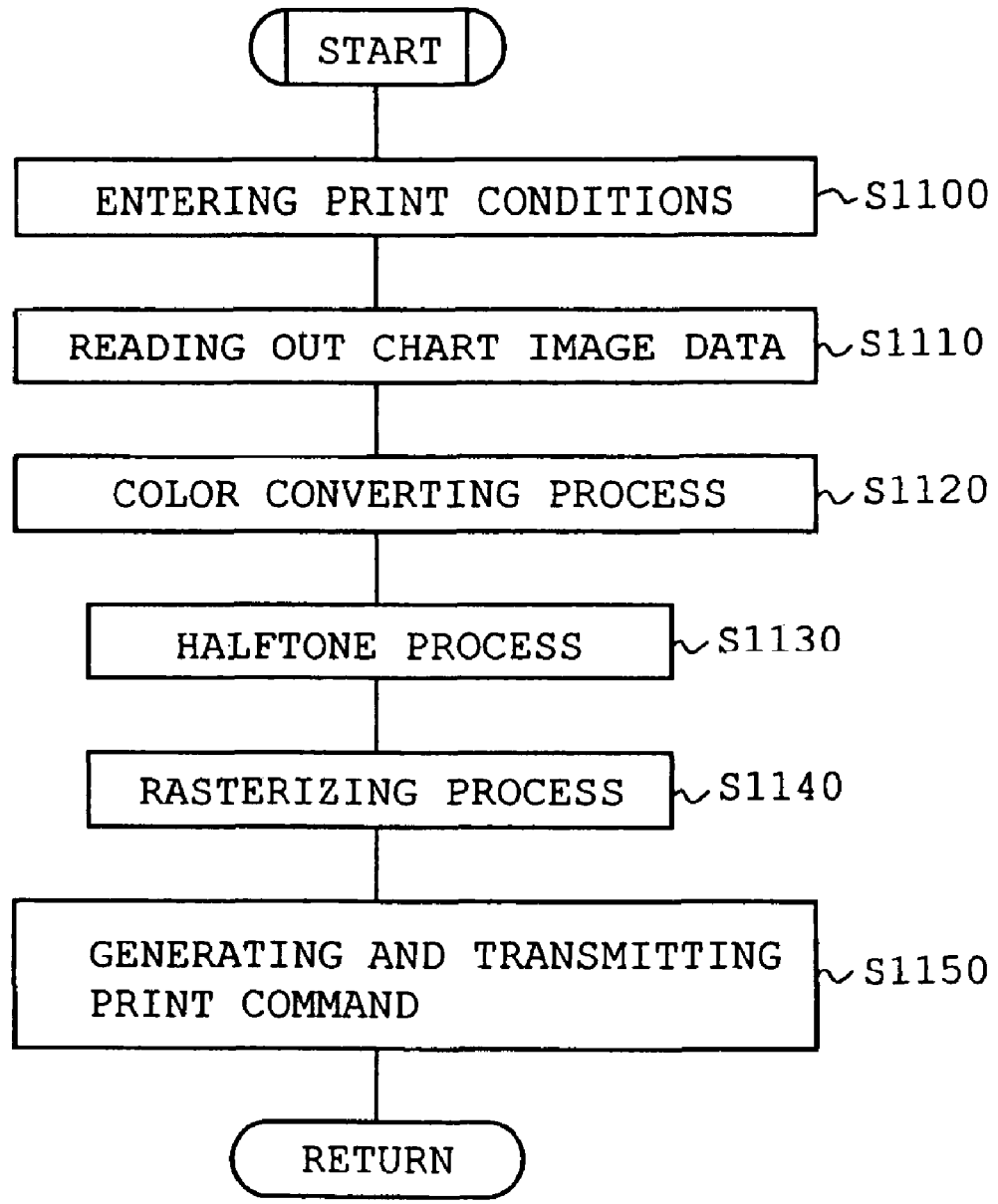
FIG. 21 is a flowchart showing instructing to print a chart image.

FIG. 21 shows processing at S1010. At S1010, the computer 10 causes the display 18a to display a print setting screen (application screen) of the chart image based on an operation by the user and enters various printing conditions via the application screen.

Figure 22:
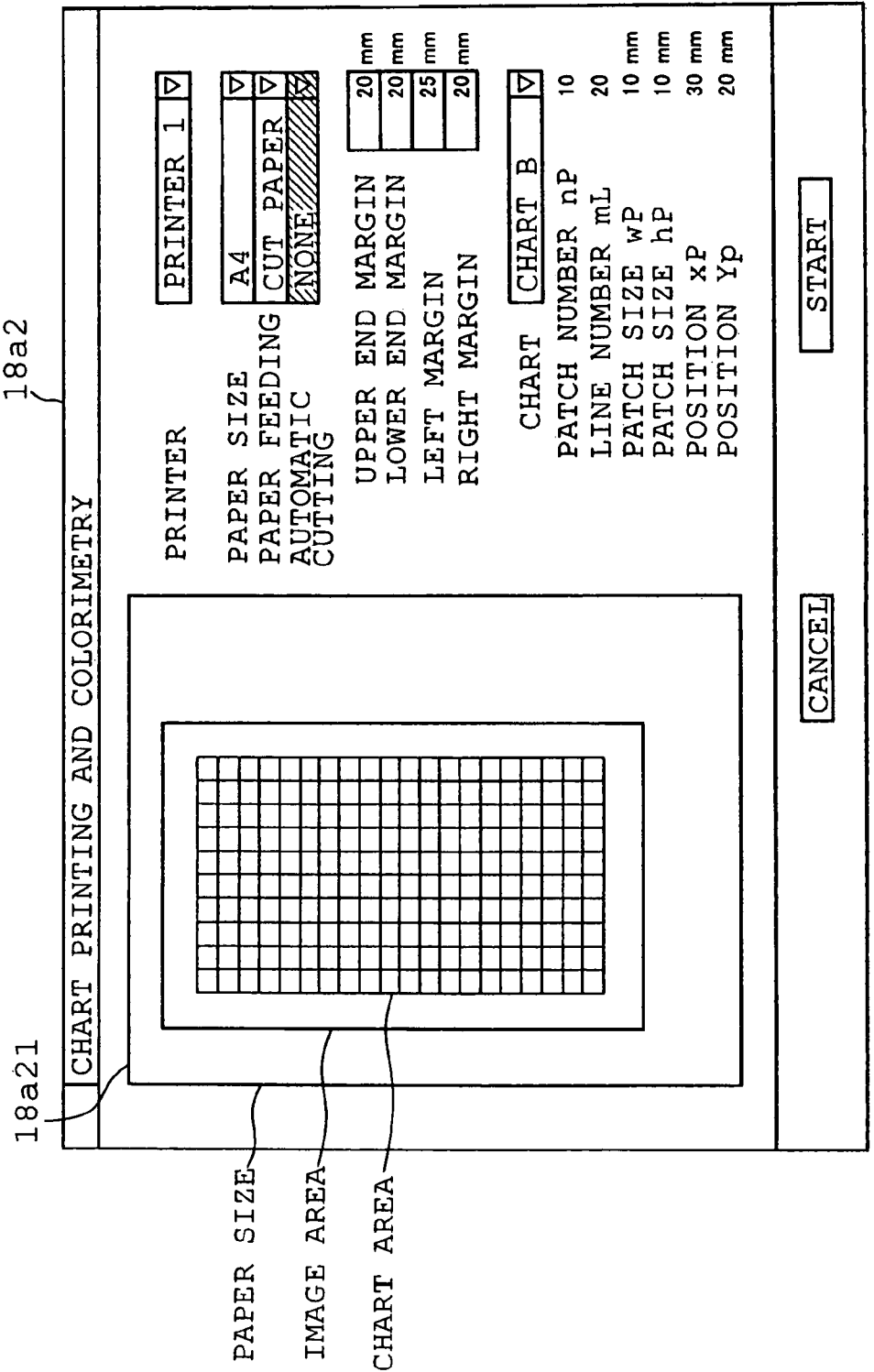
FIG. 22 shows an application screen.

FIG. 22 shows an example of an application screen. The application screen 18a2 carries out display for entering the printing conditions as the application screen 18a1, whereupon the computer 10 obtains the paper size, the upper, lower, right and left end margins of the paper, a type of chart and the like according to the user's entering operation. The horizontal and vertical size of each patch composing the verification chart (hP, wP), the number of patches per line of verification chart (nP), the number of patch lines (mL) and the chart area position (xP, yP) are previously defined for every type of verification chart. Accordingly, these are automatically determined upon selection of verification chart. The position (xP, yP) signifies a starting position PS of the chart area on the basis of the origin (starting position of image area) of the image area of the chart image. Furthermore, preview display 18a21 is also carried out for the chart image disposed on the printing paper in the same manner as the application screen 18a1.

At S1110, the computer 10 reads out from the HD 14 chart image data 14e representative of the chart image selected at the time of input of the printing condition. In the embodiment, each of pixels of the chart image data 14e is expressed by RGB.

Subsequently, the APL 14a starts the PRTDRV 14b so that the chart image data 14e is supplied to the PRTDRV 14b. The APL 14a then causes the PRTDRV 14b to carry out a color conversion process (S1120), a halftone process (S1130), a rasterizing process (S1140) and generation and transmission process of a printing command (S1150).

The print command includes a print area definition command and a printing position renewal command and a print data command as described above. The print area definition command contains information about the paper size and margins obtained at S1100 and instructs the printer 20 to set the position of the print head 25a at the starting position of the image area of the chart image on the paper M. The printing position renewal command instructs a print starting position of the chart area for every scan by the print head 25a. The print starting position of the chart area on the printing paper can be specified by the vertical size of the patch (hP) and the number of patch lines (mL). The print command may instruct to carry out solid printing in a specified color or not to carry out printing regarding a print stabilizing area of the image area of the chart image. At the side of the printer 20 having received the print command, the printer controller 250 is caused to carry out the process of printing the chart image as shown in FIG. 19 on the paper M based on the control. The printing process in detail is the same as in the first embodiment.

At S1020, the computer 10 instructs the printer 20 to carry out colorimetry of the chart image and obtains a calorimetric value of the chart image. The processing at S1020 is basically the same as FIG. 12 and the colorimetry instruction is a process of generating and transmitting a chart definition command, drying command and colorimetry command. The chart definition command in the embodiment has chart definition information (image position information) defining the position of the chart area of the chart image in the paper M. The chart definition information defines the horizontal and vertical size of each patch (hP, wP), the number of patches (nP), patch line numbers (mL) and the like as well as the starting position (xS, yS) of the chart area on the basis of the paper origin and end position of the chart area (xE, yE). The starting position (xS, yS) can be defined by the upper end margin, left margin and chart position (xP, yP). Regarding the horizontal and vertical size of each patch, the number of patches and patch line numbers, the printer 20 reads out data of horizontal and vertical size of each patch, the number of patches and patch line numbers previously stored according to the chart image selected by the user. The data thus read out serves as part of the chart definition information. Regarding the end position (xE, yE), xE is the sum of xS and wP×nP, whereas yE is the sum of yS and hP×mL.

A spontaneous drying command or forced drying command can be generated as the drying command. However, the spontaneous drying command is basically generated in the embodiment. The reason for this is that it is not practical to dry a patch group contained in a large number of lines such as the chart image by the drier 26d. The colorimetry command instructs the printer 20 to feed the printing paper M so that each line of the chart area is sequentially located under the movement path of the colorimetry portion 26a.

The processing at the side of the printer 20 having sequentially received the chart definition command, drying command and colorimetry command is the same as in FIGS. 9 and 14 except the change of the target of colorimetry from the verification chart to the chart area in FIG. 19. since the drying command is the spontaneous drying command in the embodiment, the above-described equation (2) is used when a feed distance for colorimetry of one line of the chart area is computed. When equations (2) to (4) are used in the embodiment, the values defined by the chart definition information generated at S1020 are of course used for the values of yS, hP, xS and xE. At S1030, the computer 10 transmits the exclusive-use canceling command to the printer 20 to release the printer 20 from the dominated state.

According to the embodiment, the computer 10 transmits the print command, chart definition command, drying command and colorimetry command to the printer 20 while dominating the printer 20 by the exclusive-use command, so that the printer can be caused to carry out automatic continuous processing of print of the chart image, drying, colorimetry and transmission of calorimetric value. Furthermore, the calorimetric value of each patch thus obtained can be used for various purposes such as calibration, generation of profile and the like.

4. Process of Setting Position of Colorimetry Portion

The following will describe a manner of setting the above-mentioned dHM (the distance between the print head 25a and the color detecting section 26a1 in the paper feed direction). It is desirable to carry out the process before execution of each embodiment.

Figure 23:
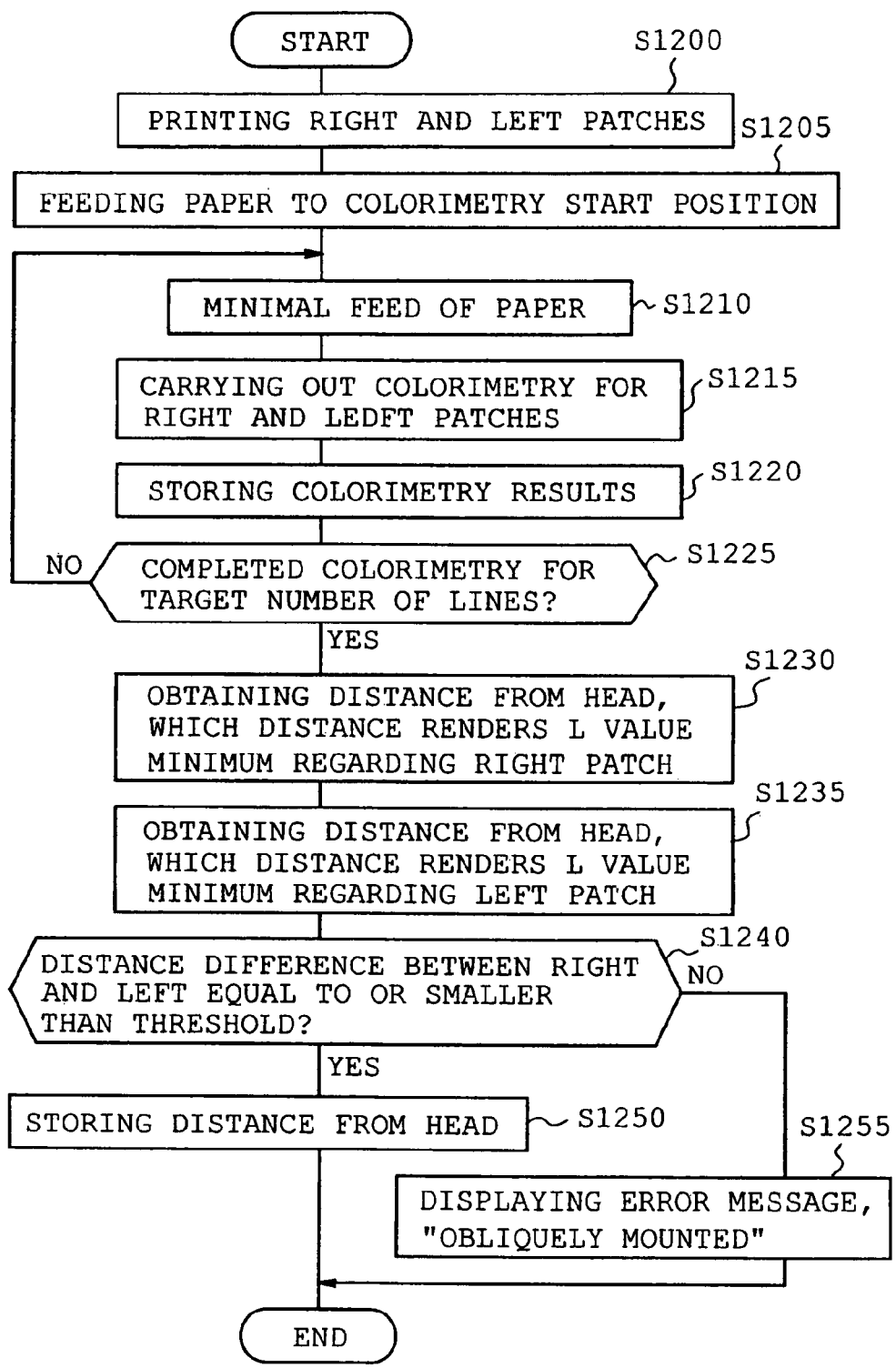
FIG. 23 is a flowchart showing a process for setting a position of calorimetric section.

FIG. 23 is a flowchart showing a process for setting a position of the calorimetric section, which process can be executable with the use of the arrangement of the print and colorimetry control device.

At S1200, the print and colorimetry control device prints the right and left patches on the paper based on predetermined colorimetry section position confirming image data. The right and left refer to the directions as viewed in the paper feed direction. The colorimetry section position confirming image data used for printing two black rectangular patches on two positions in the paper feed direction or right and left sides at both sides of the center on the paper. More specifically, the computer 10 coverts the colorimetry section position confirming image data to raster data and transmits the raster data to the printer 20 so that the printer 20 carries out printing based on the raster data.

Figure 24:
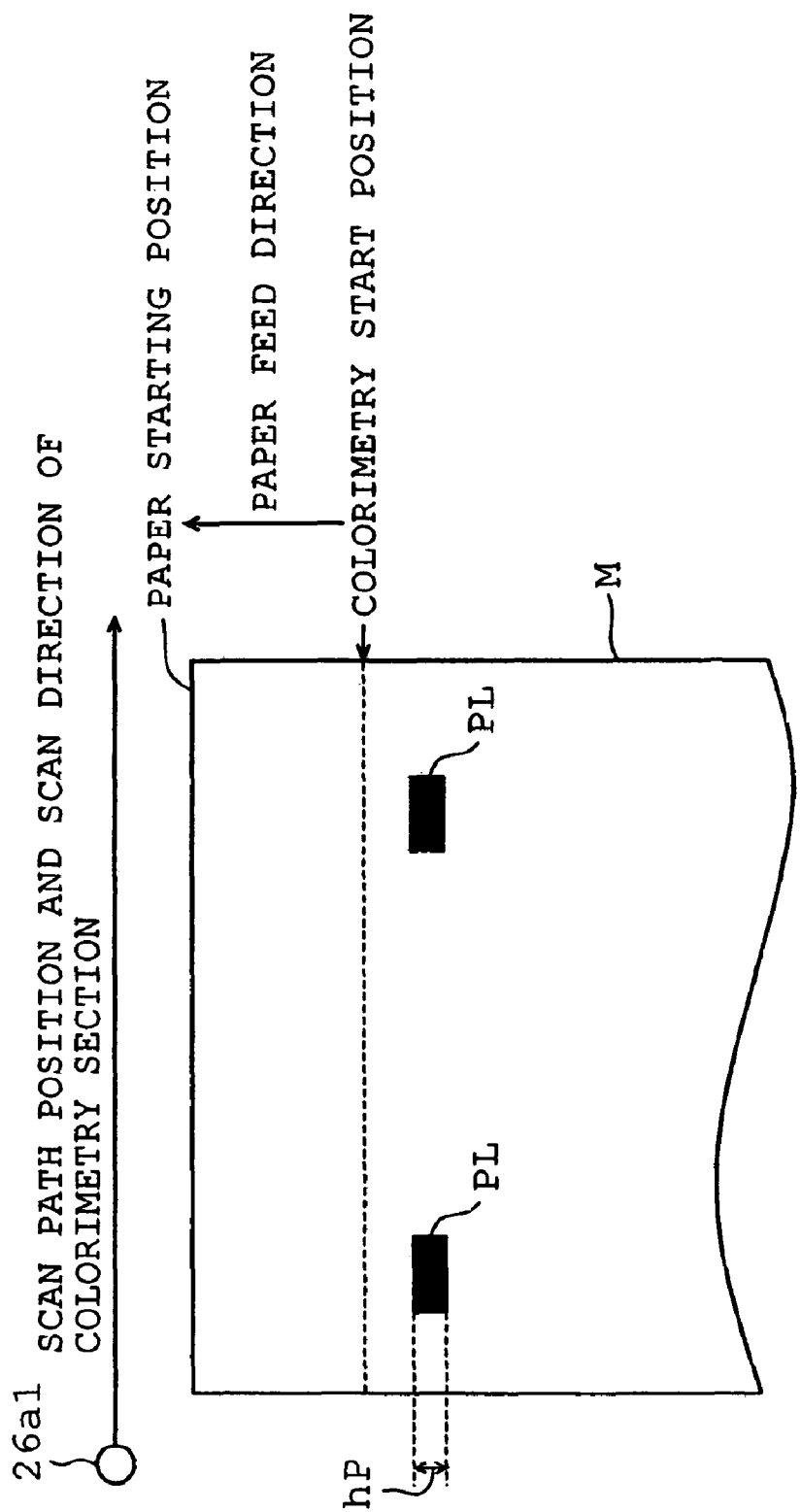
FIG. 24 shows right and left patches printed based on image data for confirmation of calorimetric section position.

FIG. 24 shows right and left patches PR and PL printed based on image data for confirmation of calorimetric section position. Each of the right and left patches PR and PL is black and has a vertical dimension hP which is the same as or slightly smaller than a diameter of the color detecting section 26a1 of the colorimetry portion 26a. For example, when the diameter of the color detecting section 26a1 is at 2 mm, the vertical dimension hP of the patch is set at about 1.8 mm.

At S1205, the printer 20 feeds the paper M in the paper feed direction so that a position (colorimetry starting position) on the paper spaced away from the patches PR and PL by the diameter of the color detecting section 26a1 toward the paper starting side comes under a movement (scanning) path of the colorimetry portion 26a.

At S1210, the printer 20 feeds the paper M in the unit of slight distance from the state where the colorimetry starting position is located under the scan path of the colorimetry portion 26a. The slight distance here refers to a distance shorter than the vertical dimension of each of the patches PR and PL and is preferably at about 0.1 mm. At 1215, the printer 20 causes the colorimetry portion 26a to carry out colorimetry while causing the colorimetry portion moving mechanism 26b to move the colorimetry portion 26a for one time of scan. At S1220, the printer 20 stores the result of colorimetry of one time of scan in a predetermined storage area.

At S1225, the printer 20 determines whether colorimetry has been completed for a target number of lines (n). When the target number of lines have not been reached, the printer 20 returns to S1210 to repeat the processing. The target number of lines corresponds to the number of scans of the colorimetry portion 26a for colorimetry of a predetermined range on the paper including the patches PR and PL. The number of lines is previously set according to the vertical dimension of the patches PR and PL and the aforesaid slight distance.

When colorimetry has been completed for the target number of lines, the printer 20 obtains a distance (head-colorimetry portion distance 1) from the print head 25a to the position on the paper where the minimum L value is obtained, in the paper feed direction, at S1230. More specifically, in the result of colorimetry of each line, one low luminance value (L value) is obtained at a scan position where the colorimetry portion 26a comes nearest to the right patch PR. The low L value of each line takes a minimum value in a line passing the central position of the right patch PR. Then, the printer 20 prints the right patch PR and thereafter obtains a feed distance of the paper that the colorimetry is carried out for the position on the paper where the minimum L value has been obtained, based on the result of colorimetry for the periphery of the right patch PR. The obtained distance serves as a head-colorimetry portion distance 1.

In the same manner, the printer 20 obtains a distance (head-colorimetry portion distance 2) from the print head 25a to the position on the paper where the minimum L value has been obtained, based on the result of colorimetry for the periphery of the left patch PL, at S1235.

At S1240, the printer 20 obtains the difference between the distances from the print head (head-colorimetry portion distance 1 and head-colorimetry portion distance 2). The printer 20 determines whether the difference is equal to or smaller than a threshold value. The threshold value may be about 0.3 mm, for example. When the difference is equal to or smaller than the threshold value, the scan direction of the colorimetry portion 26a can be regarded as parallel to the scan direction of the print head 25a. Accordingly, the printer 20 sets the above head-colorimetry portion distance 1 (or head-colorimetry portion distance 2) as the dHM value and stores data of the dHM value in a predetermined storage area.

On the other hand, when the difference between the head-colorimetry portion distance 1 and the head-colorimetry portion distance 2 is larger than the threshold value, the scan direction of the colorimetry portion 26a is inclined relative to the scan direction of the print head 25a. In other words, the colorimetry and drying unit 28 can be considered not to be mounted properly. In this case, the printer 20 informs the computer 10 that the colorimetry and drying unit 28 is not mounted properly. The computer 10 causes the display 18a to display the error message that the right side is lower 3 mm, thereby urging the user to correct the mounting direction of the colorimetry and drying unit 28 (S1255).

Figure 25A:
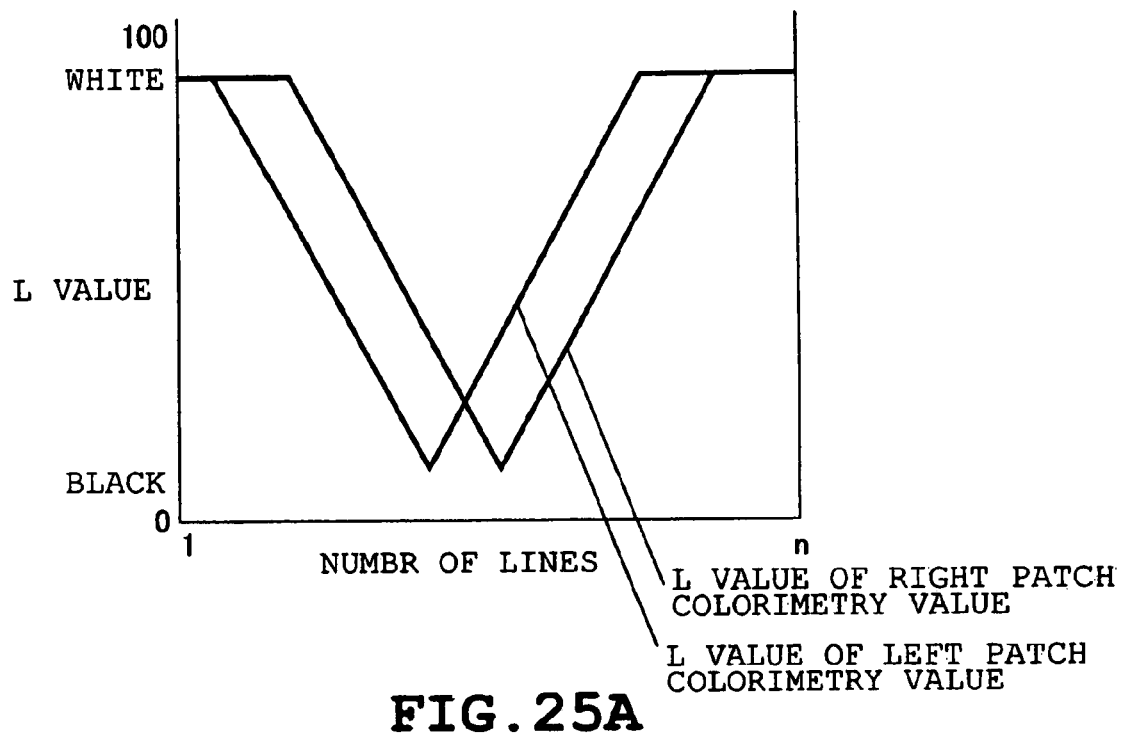
FIGS. 25A and 25B are right and left patches showing variations in calorimetric L value in each calorimetric line.
Figure 25B:
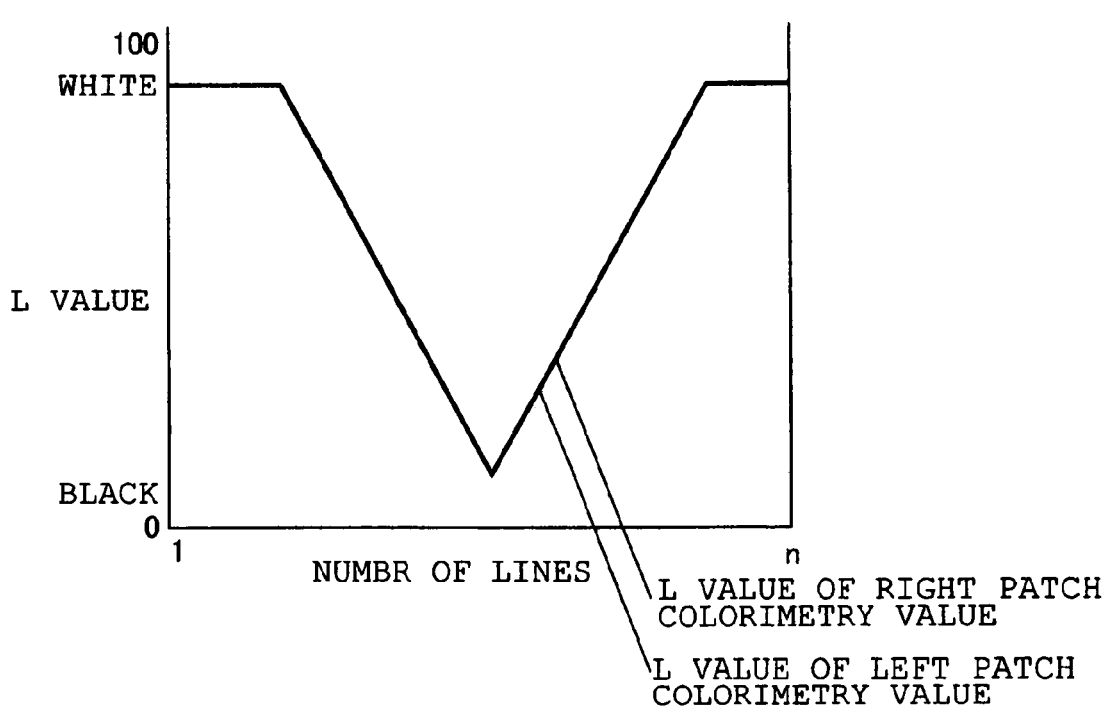

FIGS. 25A and 25B show the relationship between the L value of the calorimetric value at the time of passing of the patch by each line and the line (1 to n) for which the colorimetry has been carried out with respect to the right and left patches PR and PL respectively. In FIG. 25A, the line for which the smallest L value has been obtained differs between the right and left patches PR and PL. Thus, when the line which has acquired the smallest L value differs between the right and left patches PR and PL, the scan direction of the colorimetry portion 26a is inclined relative to the scan direction of the print head 25a, and an error message is displayed at S1255.

On the other hand, in the case of FIG. 25B, the L values of the right and left patches PR and PL substantially correspond with each other. Thus, when the smallest L values of the right and left patches PR and PL correspond with each other, the scan direction of the colorimetry portion 26a is regarded as parallel to the scan direction of the print head 25a.

According to the setting process of the position of the colorimetry portion, the distance dHM between the print head 25a and the color detecting section 26a1 is expected to be slightly different for every printer 20. The distance dHM is actually calculated and the result of calculation is referred to when the paper is fed in the drying process or colorimetry process. Accordingly, the portion of the paper for which drying or colorimetry is to be carried out can accurately be fed relative to the direr 26d or the colorimetry portion 26a. Furthermore, when the mounting position of the colorimetry and drying unit 28 is improper, the user is informed of the improper mounting. As a result, the colorimetry and drying unit 28 can be prevented from being kept mounted on the improper position.

5. Summary

According to the embodiment, the application delivering various instructions to the printer 20 supplies a print command, chart definition command, drying command and colorimetry command to the printer 20, the printer 20 receives the printing command thereby printing a predetermined image. The printer 20 receives the drying command or colorimetry command, automatically computing a feed distance of the printing paper using information about the position of the image for which colorimetry is to be executed and which is defined by the chart definition command. The paper is fed relative to the drier 26*d* or colorimetry portion 26*a* in accordance with the obtained distance or the forced drying is carried out by the drier 26*d*. Thus, the movement distance of the colorimetry portion 26*a* is computed based on the information about the position of the image for which colorimetry is to be carried out, and the like. The colorimetry process is carried out while the colorimetry portion 26*a* is moved according to the calculated movement distance.

More specifically, when the invention is used, the sequential work of print of an image, drying, colorimetry and obtainment of a calorimetric value can be carried out accurately in a shorter period of time when the user enters predetermined data on an application screen. Furthermore, since the APL 14*a* of the computer 10 dominates the printer 20 during the above-mentioned sequential work, the work can be prevented from being interrupted by another instruction output source.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A print and colorimetry control device comprising:
    a print control section that controls so that an image for which colorimetry is to be carried out is printed on a printing medium, based on predetermined image data;
    a determining section that determines a determined position where a colorimetry section is caused to carry out colorimetry for the image based on a printing position of the image on the printing medium;
    a feeding section that feeds the printing medium having finished printing, based on the determined position; and
    a colorimetry control section that controls the colorimetry section based on the determined position so that the colorimetry section is caused to carry out colorimetry thereby to obtain a colorimetric value of the image, wherein
    the colorimetry control section is configured to control a drier that dries the printing medium, and when a forced drying that forcibly dries the image on the printing medium, the image is dried by the drier before colorimetry is carried out;
    the colorimetry section and the drier are provided at respective predetermined positions in a medium feed direction;
    the determining section computes a distance from the image via a position of the drier to the colorimetry section in the medium feed direction when the forced drying is carried out; and
    the feeding section feeds the printing medium printed with the image via the position of the drier based on the computed distance.

2. The print and colorimetry control device according to claim 1, wherein the determining section computes a distance between the image and the colorimetry section, based on image position information defining the printing position of the image on the printing medium and medium position information relating to a position of the printing medium, thereby determining the position where the colorimetry section is caused to carry out colorimetry for the image.

3. The print and colorimetry control device according to claim 2, wherein the feeding section feeds the printing medium printed with the image according to the computed distance in the medium feed direction, and the colorimetry control section moves the colorimetry section in a direction substantially perpendicular to the medium feed direction according to a distance between the image and the colorimetry section in a moving direction of the colorimetry section.

4. The print and colorimetry control device according to claim 1, further comprising a judging section that compares a colorimetric value of the image obtained by the colorimetry section with a previously provided reference color value of the image, thereby judging whether a printing process by the print control section has normally been carried out, based on a result of comparison.

5. A print and colorimetry control method for a printer with a colorimetry section and a drier that dries a printing medium comprising:
    printing on the printing medium an image for which colorimetry is to be carried out, based on predetermined image data;
    determining a determined position where the colorimetry section provided at a first predetermined position in a medium feed direction is caused to carry out colorimetry for the image based on a printing position of the image on the printing medium;
    feeding the printing medium on which the image has been printed, based on the determined position; and
    causing the colorimetry section to carry out colorimetry based on the determined position, thereby obtaining a colorimetric value of the image, wherein
    controlling the drier provided at second predetermined position in the medium feed direction, and when a forced drying that forcibly dries the image on the printing medium, the image is dried by the drier before colorimetry is carried out;
    computing a distance from the image via a position of the drier to the colorimetry section in the medium feed direction when the forced drying is carried out; and
    feeding the printing medium printed with the image via the position of the drier based on the computed distance.

6. The print and colorimetry control method according to claim 5, further comprising computing a distance between the image and the colorimetry section, based on image position information defining the printing position of the image on the printing medium and medium position information relating to a position of the printing medium, thereby determining the position where the colorimetry section is caused to carry out colorimetry for the image.

7. The print and colorimetry control method according to claim 5, further comprising feeding the printing medium printed with the image according to the computed distance in the medium feed direction, and moving the colorimetry section in a direction substantially perpendicular to the medium feed direction according to a distance between the image and the colorimetry section in a moving direction of the colorimetry section.

8. The print and colorimetry control method according to claim 5, further comprising comparing a colorimetric value of the image obtained by the colorimetry section with a previously provided reference color value of the image, thereby judging whether a printing process has normally been carried out, based on a result of comparison.

9. A printer comprising:
a print control section that prints an image for which colorimetry is to be carried out on a printing medium, based on predetermined image data;
a colorimetry section;
a determining section that determines a determined position where the colorimetry section is caused to carry out colorimetry for the image based on a printing position of the image on the printing medium;
a feeding section that feeds the printing medium having finished printing, based on the determined position; and
a colorimetry control section that controls the colorimetry section based on the determined position so that the colorimetry section is caused to carry out colorimetry thereby to obtain a colorimetric value of the image, wherein
the colorimetry control section is capable of controlling a drier that dries the printing medium, and when a forced drying forcibly dries the image on the printing medium, the image is dried by the drier before colorimetry is carried out;
the colorimetry section and the drier are provided at respective predetermined positions in a medium feed direction;
the determining section computes a distance from the image via a position of the drier to the colorimetry section in the medium feed direction when the forced drying is carried out; and
the feeding section feeds the printing medium printed with the image via the position of the drier based on the computed distance.

10. The printer according to claim 9, wherein the determining section computes a distance between the image and the colorimetry section, based on image position information defining the printing position of the image on the printing medium and medium position information relating to a position of the printing medium, thereby determining the position where the colorimetry section is caused to carry out colorimetry for the image.

11. The printer according to claim 9, wherein the feeding section feeds the printing medium printed with the image according to the computed distance in the medium feed direction, and the colorimetry control section moves the colorimetry section in a direction substantially perpendicular to the medium feed direction according to a distance between the image and the colorimetry section in a moving direction of the colorimetry section.

12. The printer according to claim 9, further comprising a judging section that compares a colorimetric value of the image obtained by the colorimetry section with a previously provided reference color value of the image, thereby judging whether a printing process by the print control section has normally been carried out, based on a result of comparison.

* * * * *